(12) United States Patent
Matsubara

(10) Patent No.: US 7,571,243 B2
(45) Date of Patent: Aug. 4, 2009

(54) INFORMATION TERMINAL, METHOD FOR CONTROLLING INFORMATION TERMINAL, PROGRAM FOR CONTROLLING INFORMATION TERMINAL, AND RECORDING MEDIUM

(75) Inventor: Goh Matsubara, Chiba (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 505 days.

(21) Appl. No.: 11/367,397

(22) Filed: Mar. 6, 2006

(65) Prior Publication Data

US 2007/0198733 A1    Aug. 23, 2007

(30) Foreign Application Priority Data

Feb. 21, 2006   (JP) ............... 2006-044509

(51) Int. Cl.
G06F 15/16   (2006.01)
(52) U.S. Cl. ............... 709/230; 709/217; 709/218; 709/219; 709/239; 709/245; 709/227; 709/228; 709/229; 709/249; 348/553
(58) Field of Classification Search ......... 709/217–219, 709/230, 239, 245, 249, 227–229; 348/553
See application file for complete search history.

(56) References Cited

U.S. PATENT DOCUMENTS

| 7,010,585 | B2 * | 3/2006 | Asami ................. 709/220 |
| 7,328,281 | B2 * | 2/2008 | Takeda et al. ........... 709/246 |
| 2001/0021916 | A1 * | 9/2001 | Takai .................... 705/14 |
| 2002/0163592 | A1 * | 11/2002 | Ueda .................... 348/602 |
| 2002/0199015 | A1 * | 12/2002 | Tari et al. .............. 709/238 |
| 2003/0058855 | A1 * | 3/2003 | Feyerabend et al. ...... 370/389 |
| 2003/0065642 | A1 * | 4/2003 | Zee ....................... 707/1 |
| 2003/0093563 | A1 * | 5/2003 | Young et al. ............ 709/245 |
| 2004/0139227 | A1 * | 7/2004 | Takeda ................. 709/245 |
| 2005/0105528 | A1 * | 5/2005 | Kobayashi ............. 370/390 |
| 2005/0188405 | A1 * | 8/2005 | Lee et al. ................ 725/63 |
| 2007/0097983 | A1 * | 5/2007 | Nylander et al. ....... 370/395.2 |

FOREIGN PATENT DOCUMENTS

| JP | 10257455 A | * | 9/1998 |
| JP | 11-017726 A | | 1/1999 |
| JP | 2000-285057 A | | 10/2000 |
| JP | 2002-176424 A | | 6/2002 |
| JP | 2002-261794 A | | 9/2002 |
| JP | 2002-305531 A | | 10/2002 |
| JP | 2003-018183 A | | 1/2003 |
| JP | 2003-143184 A | | 5/2003 |
| JP | 2003-273896 A | | 9/2003 |

(Continued)

Primary Examiner—Alina N. Boutah
(74) Attorney, Agent, or Firm—Birch, Stewart, Kolasch & Birch, LLP

(57) ABSTRACT

A program information providing site sends to a broadcast station, IP address look-up information that informs association of URI of a program information providing site and an IP address of a particular site. The broadcast station broadcasts the IP address look-up information to portable telephones. According to contents of a broadcast program currently on the air, the IP address associated with the URI of the program information providing site is changed. Thereby, the site in association with the broadcast program is dynamically changed. This allows a user to view various sites by accessing to the same URI.

12 Claims, 23 Drawing Sheets

FOREIGN PATENT DOCUMENTS

| | | |
|---|---|---|
| JP | 2004-023155 A | 1/2004 |
| JP | 2004-032103 A | 1/2004 |
| JP | 2005-094252 A | 4/2005 |
| JP | 2005-094446 A | 4/2005 |
| JP | 2005-327075 A | 11/2005 |
| WO | WO-01/56245 A1 | 8/2001 |

* cited by examiner

```
www.earthquake-infor.com
     +192.168.0.1
     +192.168.0.2
     +192.168.0.3
     +192.168.0.4
```

```
www.earthquake-infor.com
     -192.168.0.1
     -192.168.0.2
     -192.168.0.3
     -192.168.0.4
```

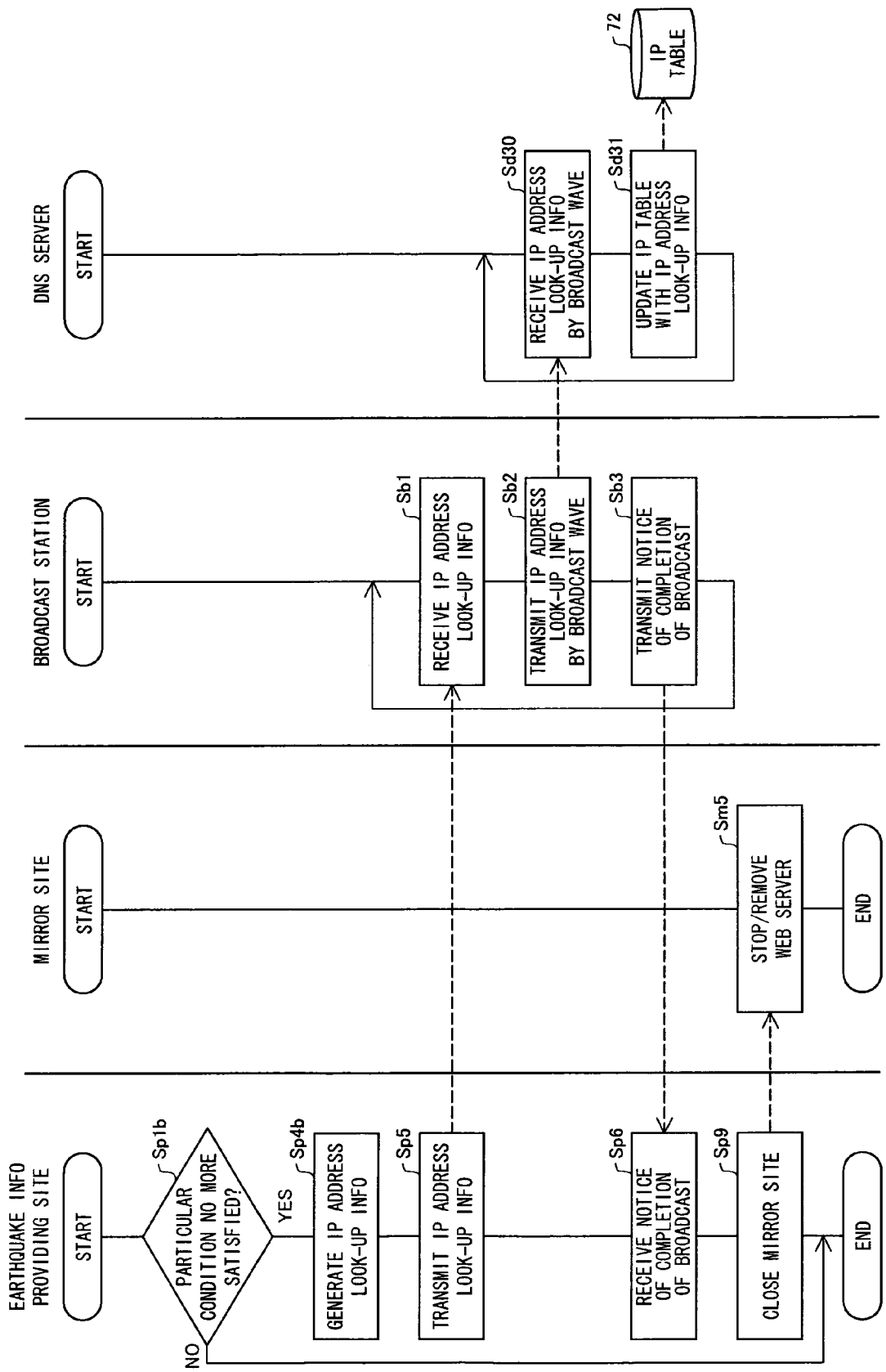

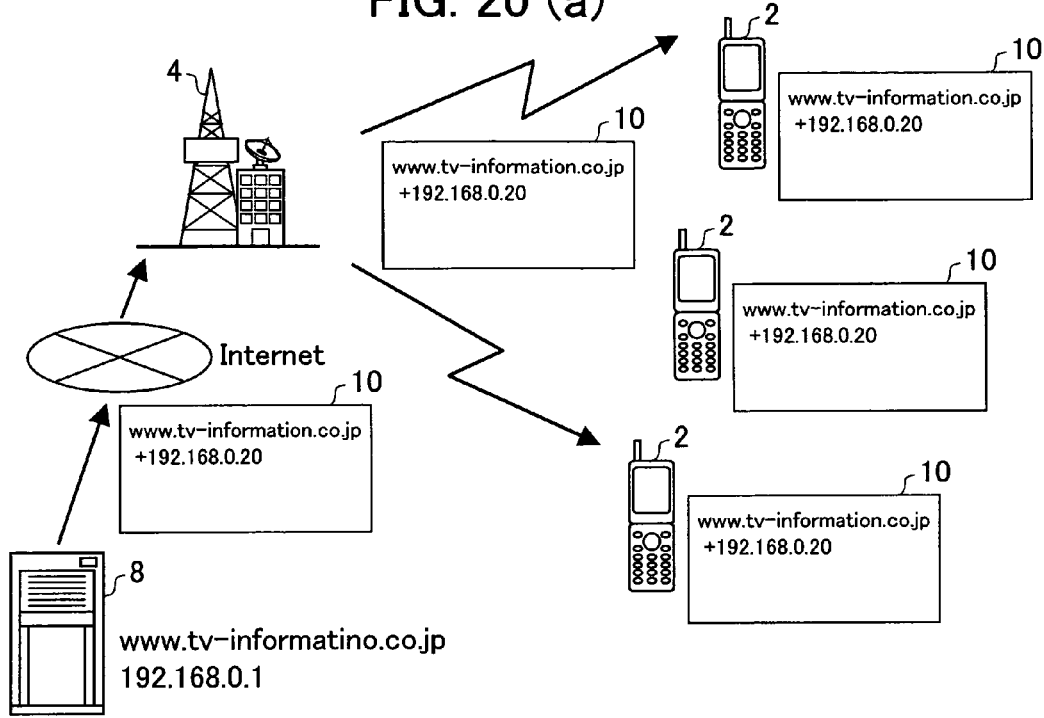
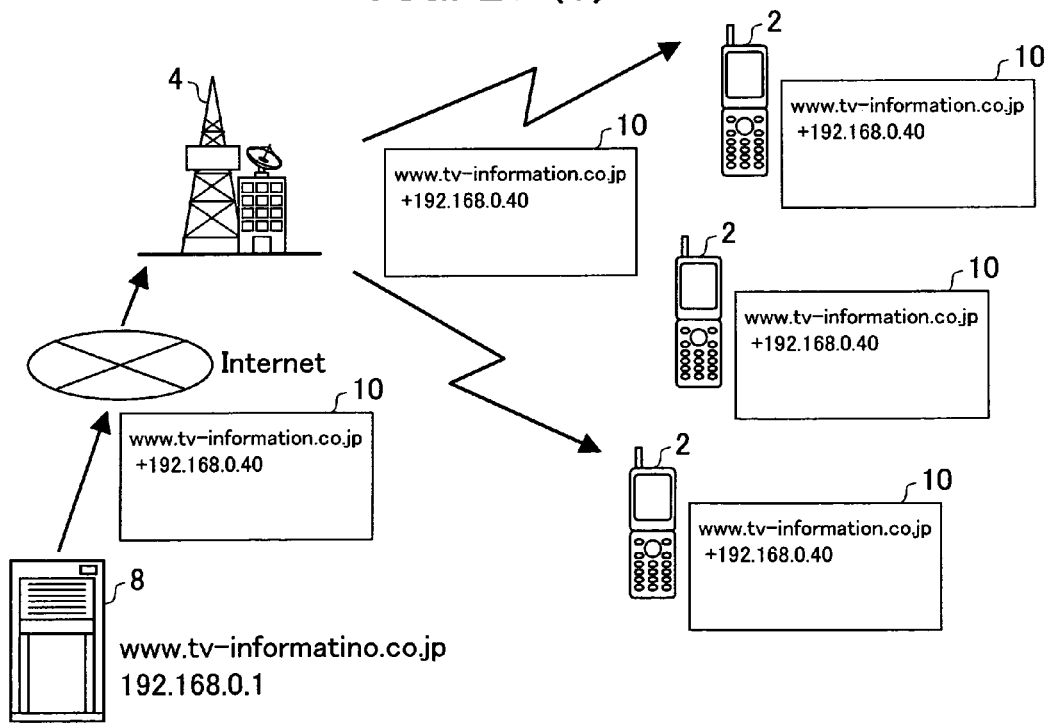

INFORMATION TERMINAL, METHOD FOR CONTROLLING INFORMATION TERMINAL, PROGRAM FOR CONTROLLING INFORMATION TERMINAL, AND RECORDING MEDIUM

This Nonprovisional application claims priority under 35 U.S.C. § 119(a) on Patent Application No. 044509/2006 filed in Japan on Feb. 21, 2006, the entire contents of which are hereby incorporated by reference.

FIELD OF THE INVENTION

The present invention relates to an information terminal which receives a broadcast electric wave, and accesses to a dynamically-changed IP (Internet Protocol) address that corresponds to a URI (Uniform Resource Identifier) of a particular site.

BACKGROUND OF THE INVENTION

Recently, portable telephones which are capable of performing Internet browsing and receiving broadcast have been developed. This leads to an idea to use such portable telephones to browse a content of a URI relating to television broadcast or radio broadcast, while watching/listening the television broadcast or radio broadcast.

The same idea can be applied to not only portable telephones. As disclosed in Japanese Unexamined Patent Publication (Tokukai) 2000-285057 (published on Oct. 13, 2000; NISHIO Ikuhiko et al.), there is an art which allows acquisition of optimal content even if the same content is placed in plural places, for example, in an art such as digital television broadcasting or the like in which a Web page is transmitted via the broadcast network and contents are exchanged via two-way network.

However, Japanese Unexamined Patent Publication (Tokukai) 2000-285057 does not disclose an art in which one address is dynamically selected from among a plurality of addresses of information providing sites according to contents of a broadcast program by reference to data superimposed on a broadcast wave and allotted to one URI that represents the broadcast program.

That is, in case where there are the plurality of broadcast program-relating information providing sites on the Internet, it is conventionally necessary to input or designate the URI of a given information providing site to browse the contents thereof.

However, it is inconvenient and difficult in case of portable telephones to input the URI by using ten keys or the like while watching/listening the broadcast.

SUMMARY OF THE INVENTION

An object of the present invention is to realize a system which is provided with information providing sites, a broadcast station, and an information terminal, and in which an address to accessed by the information terminal in response to designation of a URI of a particular information providing site is changed dynamically based on a broadcast wave, and an information terminal for use in such a system.

(1) An information terminal according to the present invention includes: a broadcast wave receiving section for receiving a broadcast wave; a name resolution section for performing name resolution in order to find, from a site name, an address to access; and a browsing section for browsing to the address found by the name resolution section. In order to attain the object, the information terminal according to the present invention is provided with: a storage section for storing look-up data that indicates association of the site name and the address that corresponds to the site name; and an information extracting section for extracting, from the broadcast wave received by the broadcast wave receiving section, data setting information with which the look-up data is to be updated so as to update the site name and the address corresponding thereto stored in the storage section or to add a site name and an address corresponding thereto in the storage section. In this arrangement, by the site registered in the look-up data, the browsing section browsing to the address being found by the name resolution section performing the name resolution by searching, across the storage section, for the address that corresponds to the site name.

Furthermore, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution section. In order to attain the object, the method according to the present includes: extracting, from the broadcast wave received by the broadcast wave receiving section, data setting information with which the look-up data is to be updated so as to update the site name and the address corresponding thereto stored in a storage section or to add a site name and an address corresponding thereto in the storage section; and the name resolution section performing the name resolution by searching, across the look-up data, for the address that corresponds to the site name, the browsing section browsing to the address by the site registered in the look-up data.

In this arrangement, the data setting information is transmitted via the broadcast wave. With the data setting information, the look-up data is updated. By this, the address to access when browsing to a given site name can be switched over according to the information provided via the broadcast. Simply by inputting or designating the site name, the information terminal can access to the address which is thus switched over. That is, it is possible to eliminate the need of manually inputting various site names to browse to the sites of the site names.

(2) An information terminal according to the present invention includes: a broadcast wave receiving section for receiving a broadcast wave; a name resolution section for performing name resolution in order to find, from a site name, an address to access; a browsing section for browsing to the address found by the name resolution section; and a current location acquiring section for acquiring a current location of the information terminal. In order to attain the object, the information terminal according to the present invention is provided with: a storage section for storing look-up data that indicates an association of a common site name and a plurality of addresses of sites that are provided for different areas respectively; an information extracting section for extracting, from the broadcast wave received by the broadcast wave receiving section, data setting information with which the look-up data is to be updated so as to update the common site name and the address(es) corresponding thereto stored in the storage section or to add a site name and an address(es) corresponding thereto in the storage section. In this arrangement, by the common site name the browsing section browsing to an address selected by the name resolution section performing the name resolution by searching, across the look-up data, for the addresses associated with the common site name, and selecting, from among the addresses, an address corresponding to an area in which the current location acquired by the current location acquired section is included.

Moreover, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution section. In order to attain the object, the method according to the present invention includes: extracting, from the broadcast wave received by the broadcast wave receiving section, data setting information with which the look-up data is to be updated so as to update the site name and the address corresponding thereto stored in a storage section or to add a site name and an address corresponding thereto in the storage section; and the name resolution section performing the name resolution by searching, across the look-up data, for the address that corresponds to the site name, the browsing section browsing to the address by the site registered in the look-up data.

In this arrangement, the data setting information is transmitted via the broadcast wave. With the data setting information, the look-up data is updated. The address to access when browsing to a given site name can be switched over according to the area in which the current location is included. Simply by inputting or designating the site name, the information terminal can access to the address which is thus switched over. That is, it is possible to eliminate the need of manually inputting various site names to browse to the sites of the site names.

(3) An information terminal according to the present invention includes: a broadcast wave receiving section for receiving a broadcast wave; a name resolution section for performing name resolution in order to find, from a site name, an address to access; and a browsing section for browsing to the address found by the name resolution section. In order to attain the object, the information terminal is provided with: a storage section for storing look-up data that indicates an association of the site name and a plurality of addresses that are in association with the site name, the plurality of addresses including the address; an information extracting section for extracting, from the broadcast wave received by the broadcast wave receiving section, data setting information with which the look-up data is to be updated so as to update the common site name and the address(es) corresponding thereto stored in the storage section or to add a site name and an address(es) corresponding thereto in the storage section; and an address selecting section for randomly selecting an address from among the plurality of addresses stored in the storage section. In this arrangement, by the site registered in the look-up data, the browsing section browsing to the address randomly selected by the address selecting section from among the plurality of addresses that correspond to the site name and are found by the name resolution section performing the name resolution by searching across the look-up data.

Furthermore, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution section. In order to attain the object, the method according to the present invention includes: extracting, from the broadcast wave received by the broadcast wave receiving section, data setting information with which the look-up data is to be updated so as to update the common site name and the address(es) corresponding thereto stored in a storage section or to add a site name and an address(es) corresponding thereto in the storage section; the name resolution section performing the name resolution by searching, across the look-up data, for the plurality of addresses that correspond to the site name; and randomly selecting an address from among the plurality of addresses found by the name resolution section, the browsing section browsing to the selected address by the site registered in the look-up address.

In this arrangement, the data setting information is transmitted via the broadcast wave. With the data setting information, the look-up data is updated. The look-up data indicates an association of the common site name and the addresses corresponding thereto. (An example of the association is an association of a given site and addresses of the given site and a mirror site thereof.) One of the addresses is randomly selected as the address to access. By this, the address to access when browsing to a given site name can be switched over according to the information provided via the broadcast. Simply by inputting or designating the site name, the information terminal can access to the address which is thus switched over. That is, it is possible to eliminate the need of manually inputting various site names to browse to the sites of the site names. Furthermore, because one of the addresses associated with the common site name is randomly selected, it is possible to attain load distribution, e.g., among the given site and its mirror site.

(4) An information terminal according to the present invention includes: a broadcast wave receiving section for receiving a broadcast wave; a name resolution section for performing name resolution in order to find, from a site name, an address to access; and a browsing section for browsing to the address found by the name resolution section; and a current location acquiring section for acquiring a current location of the information terminal. In order to attain the object, the information terminal according to the present invention is provided with: a storage section for storing look-up data that indicates associations of a site name and a plurality of addresses of sites that are provided for different areas respectively; an information extracting section for extracting, from the broadcast wave received by the broadcast wave receiving section, data setting information with which the look-up data is to be updated so as to update the association of the site name and the address(es) stored in the storage section or to add an association of a site name and an address(es) in the storage section; an address selecting section for randomly selecting an address from among the plurality of addresses in the associations that are stored in the storage section and correspond to an area in which the current location acquired by the current location acquiring section is included. In this arrangement, by the site name, the browsing section browsing to the address randomly selected by address selecting section from among the plurality of addresses of the associations that correspond to the site name and are found by the name resolution section performing the name resolution by searching across the look-up data.

Moreover, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution section; and a current location acquiring section for acquiring a current location of the information terminal. In order to attain the object, the method according to the present invention is provided with: extracting, from the broadcast wave received by the broadcast wave receiving section, data setting information with which the look-up data is to be updated so as to update the association of the site name and the address(es) stored in a storage section or to add an association of a site name and an address(es) in the storage section; the name resolution section performing the name resolution by searching, across the look-up data, for the plurality of addresses of the associations that correspond to the site name; and randomly selecting an address from among the plurality of addresses of the associations found by the name resolution section, the browsing section browsing to the selected address by the site name. In this arrangement, the data setting information is transmitted via the broadcast wave. With the data setting information, the look-up data is updated. The look-up data indicates an association of the common site name and the addresses corresponding thereto. (An example of the association is an association of a given site and addresses of the given site and a mirror site thereof.) The addresses associated with a given site name can be switched over according to the area in which the current location is included. One of the addresses is randomly selected as the address to access. By this, the address to access when browsing to the given site name can be randomly selected from the addresses switched over according to the current location of the information terminal. Simply by inputting or designating the site name, the information terminal can access to the address which is thus selected from the addresses thus switched over. That is, it is possible to eliminate the need of manually inputting various site names to browse to the sites of the site names. Furthermore, because one of the addresses associated with the common site name is randomly selected, it is possible to attain load distribution, e.g., among the given site and its mirror site.

The information terminal may be realized as a hardware, or may be realized by running a program on a computer. Specifically, a program (program for controlling an information terminal) according to the present invention is an information processing program that causes a computer to function as at least the name resolution section, browsing section, and information extracting section. A storage medium according to the present invention stores therein the information processing program.

The computer operates as any of the above-described information terminal by running the information processing program on the computer.

With these arrangements, it is possible to attain the same effects as the above-mentioned effects of the information terminals according to the present invention. Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1(a) is a view illustrating broadcast of IP address look-up information 10 from an earthquake information providing site 1 to a portable telephones 2. FIG. 1(b) is a view illustrating load distribution among the earthquake information providing site 1 and mirror sites 5 to distribute accesses from the portable telephones 2 among them.

FIGS. 5(a) and 5(b) illustrate examples of description of the IP address look-up information 10 of the first embodiment according to the present invention. FIG. 5(a) illustrates the example of description for registering, on an IP table 32 of the portable telephone 2, associations of an FQDN of the earthquake information providing site 1 and IP addresses of the earthquake information providing site 1 and mirror sites 5. FIG. 5(b) illustrates the example of description for erasing, from the IP table 32 of the portable telephone 2, associations of an FQDN of the earthquake information providing site 1 and IP addresses of the earthquake information providing site 1 and mirror sites 5.

FIG. 13(a) illustrates broadcast of IP address look-up information from an earthquake information providing site 1 to a DNS server 6. FIG. 13(b) illustrates load distribution among the earthquake information providing site 1 and mirror site 5 in order to distribute accesses from Web clients 7 by the name resolution performed by the DNS server 6.

FIG. 19 is a flowchart illustrating procedures of updating the IP table 72 and closing the mirror sites 5 when restoring to the normal state in the second embodiment of the present invention.

FIGS. 20(a) and 20(b) illustrate a third embodiment. FIG. 20(a) is a view illustrating broadcast of IP address look-up information 10 which indicates association of a URI of a program information providing site 8 and an IP address (192.168.0.20) of an information providing site for corresponding shopping. FIG. 20(b) is a view illustrating broadcast of IP address look-up information 10 which indicates association of a URI of a program information providing site 8 and an IP address (192.168.0.40) of an information providing site for news program.

FIG. 21 illustrates broadcast of IP address look-up information 10 from a local information providing mater site 9 to a portable telephone 2, the IP address look-up information 10 informing association of a URI of the local information providing mater site 9 and IP addresses of the local information providing sites. The portable telephone 2 in a first area selects an IP address of an area information providing site for providing information of the first area. The portable telephone 2 in a second area selects an IP address of an area information providing site for providing information of the second area. The portable telephone 2 in a third area selects an IP address of an area information providing site for providing information of the third area.

DESCRIPTION OF THE EMBODIMENTS

First Embodiment

One embodiment of a portable telephone and a network system of the present embodiment is descried below, referring to FIGS. 1 to 12. The present embodiment prevents concentration of accesses to an information providing site on the Internet.

In the present embodiment, it is supposed that a particular event is an earthquake and a particular site is a site (earthquake information providing site) providing information on the earthquake (http://www.earthquake-infor.com; this URI is merely an example and not existed. It is supposed that a large number of users of the portable phones of the present invention access to the information providing site after the earthquake occurred.

<Outline>

Figure 1:
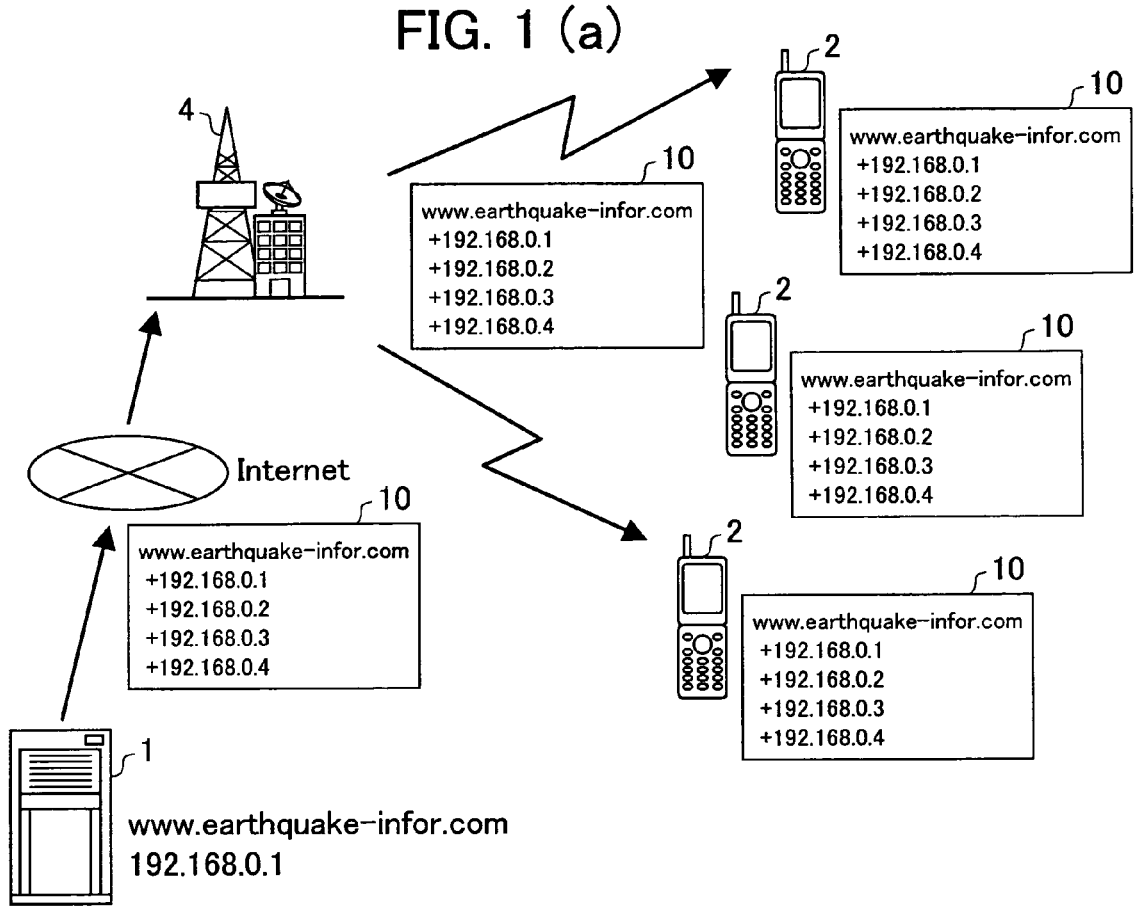
FIGS. 1(a) and 1(b) illustrate a first embodiment of the present embodiment.
Figure 1:
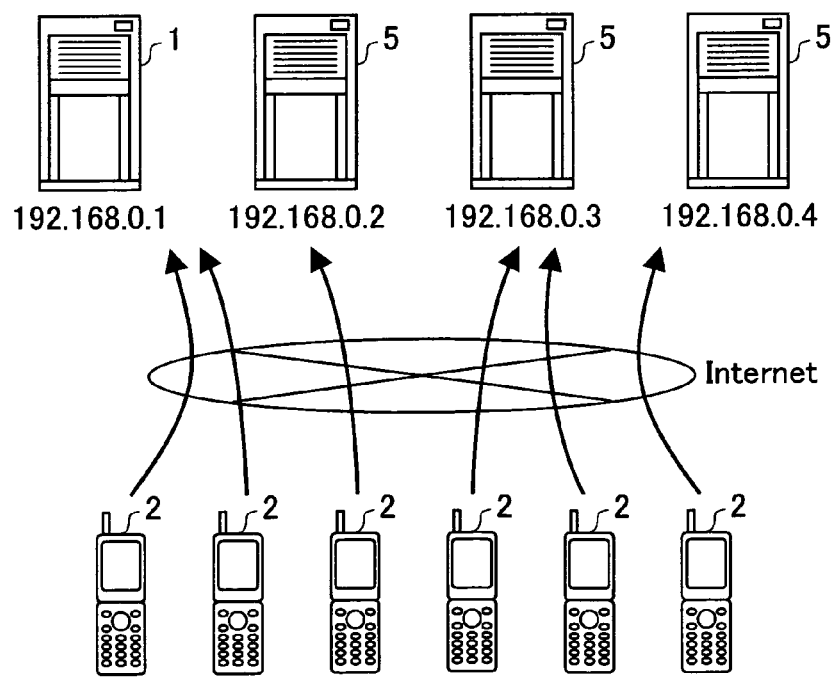
Figure 2:
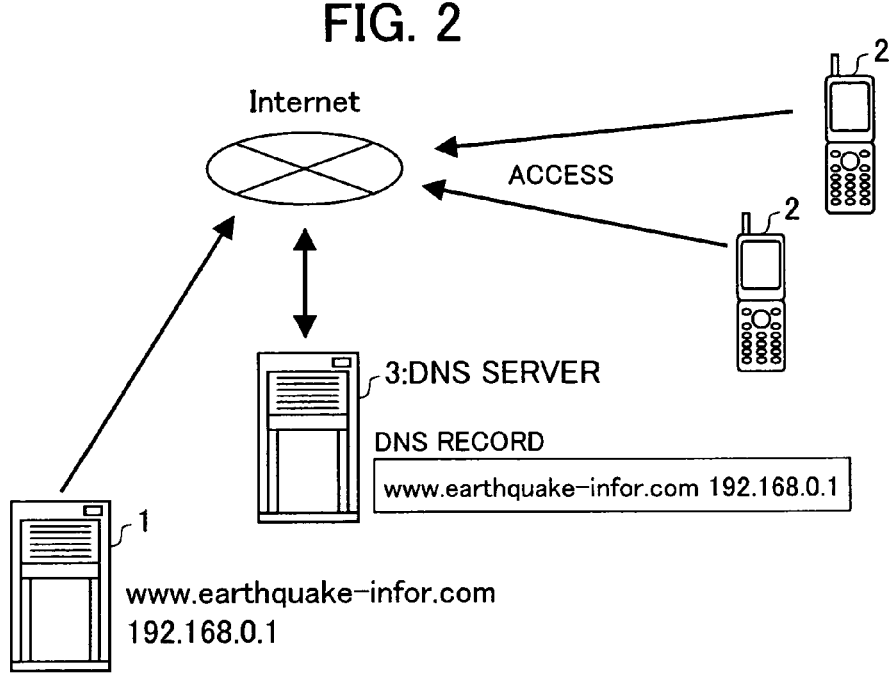
FIG. 2 is a view illustrating the first embodiment according to the present invention by illustrating how to access to the earthquake information providing site from the portable telephone 2 in a normal state.

FIGS. 1(a), 1(b), and 2 illustrate elements of the network according to the present invention in normal situation, that is, before the earthquake occurred, and elements of the network according to the present invention after the earthquake occurred. FIG. 2 illustrates a pre-earthquake condition, whereas FIG. 1 illustrate a post-earthquake condition. FIG. 1(a) illustrates delivery of a look-up table for access load distribution to each portable telephone. FIG. 1(b) illustrates a condition where the accesses from the portable telephones are distributed from the particular information providing site.

<Outline of Process for Normal State>

In the normal situation, a user of a portable telephone 2 according to the present invention accesses to an earthquake information providing site 1 via the Internet as follows. URI of the earthquake information providing site 1 is designated. Then, a browser of the portable telephone 2 inquires a DNS server 3 for name resolution of the URI of the earthquake information providing site 1. The DNS server 3 provides an IP address that corresponds to FQDN (Fully Qualified Domain Name) of the earthquake information providing site. After that, the portable telephone 2 accesses to the earthquake information providing site 1 at the IP address (192.168.0.1).

The DNS server 3 has a DNS record that shows association between FQDN (www.earthquake-infor.com) of the earthquake information providing site 1 and the IP address (192.168.0.1) thereof. Thus, the DNS server 3 informs the portable telephone 2 of the IP address (192.168.0.1) of the earthquake information providing site 1. For the sake of easy explanation, the private IP address is regarded as a public IP address of the earthquake information providing site 1.

<Outline of Process in Post-Earthquake Condition>

In case where an earthquake occurred, the earthquake information providing site 1, a broadcast station 4 and the portable telephones 2 perform the following processes:

(1) The earthquake information providing site 1 opens (create) a mirror site 5 to which the earthquake information to be provided is copied.

(2) The earthquake information providing site 1 provides IP address look-up information 10 to the broadcast station 4. The IP address look-up information 10 shows the association between the FQDN of the earthquake information providing site 1 and an IP address of the mirror site 5, as well as between the FQDN and the IP address of the earthquake information providing site 1.

(3) The broadcast station 4 broadcasts to the portable telephones 2 the IP address look-up information 10 provided from the earthquake information providing site 1 (the condition illustrated in FIG. 1(a))

(4) When their users instruct to access to the earthquake information providing site 1, the portable telephones 2, which received the IP address look-up information 10, randomly select one of the IP addresses (which are contained in the IP address look-up information 10) of the earthquake information providing site 1 and the mirror site 5, and access to the IP address thus selected, thereby accessing to the earthquake information providing site 1 or the mirror site 5 (the condition illustrated in FIG. 1(b)).

Note that the mirror site 5 may be one or more. If there is an Internet data center, which rents an Internet-connected computer on time base, the Internet-connected computer may be used as a mirror site as long as needed.

Moreover, the mirror site 5 may be located in a geographically or network-topologically remote area from the earthquake information providing site 1 (master site), as long as the accesses from the portable telephones 2 can be distributed.

<Outline of Process when Normal State is Recovered>

After a sufficient time elapsed since the occurrence of the earthquake, the access amount to the earthquake information providing site 1 decreases and there is no possibility of server down due to overload. Then, the earthquake information providing site 1, the broadcast station 4 and the portable telephones 2 perform the following processes:

(1) The earthquake information providing site 1 gives the broadcast station 4 an instruction (erasing instruction) of erasing the IP address look-up information 10 that the portable telephones 2 have.

(2) The broadcast station 4 broadcasts to the portable telephones 2 the erasing instruction given from the earthquake information providing site 1.

(3) The portable telephones 2, which receive the erasing instruction, erase the IP address look-up information 10.

(4) The broadcast station 4 notifies the earthquake information providing site 1 of completion of the broadcasting of the erasing instruction.

(5) The earthquake information providing site 1 closes the mirror site 5.

After these steps are carried out, the way of accessing from the portable telephone 2 to the earthquake information providing site 1 is restored the way normally carried out. The IP address look-up information 10 may be arranged to contain a period of validity of the IP address look-up information 10, so that after the validity is expired, the IP address look-up information 10 will be erased in the portable telephone 2 that receives the IP address look-up information 10 in the case of earthquake but could not receive the erasing instruction.

<Arrangement of Earthquake Information Providing Site 1>

Figure 3:
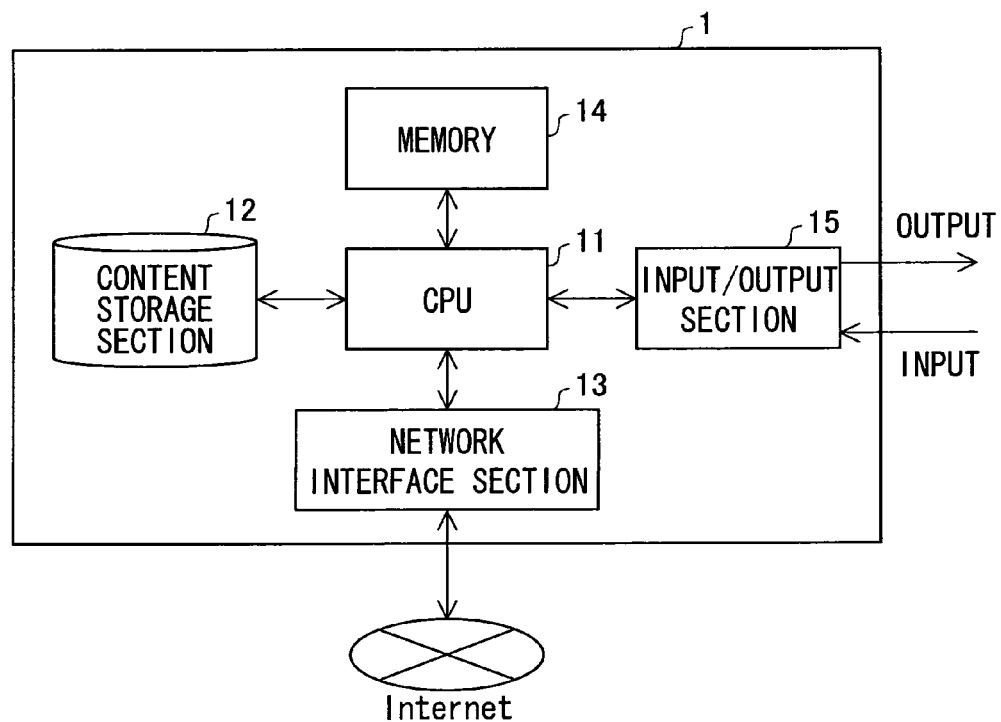
FIG. 3 is a block diagram of the earthquake information providing site 1 of the first embodiment according to the present invention.

FIG. 3 is a block diagram illustrating an arrangement of the earthquake information providing site 1.

The Earthquake information providing site 1 is provided with a CPU 11, a content storing section 12, a network interface section 13, a memory 14, and an input/output section 15.

The CPU 11 realizes functional blocks later described. The content storing section 12 stores contents that the earthquake information providing site 1 provides. In response to a request from a Web client, the content storing section 12 provides a given content stored therein or a content that is created in response to a request. The network interface section 13 is constituted by a network interface card (NIC) or the like, and is used for communication via the Internet. The memory 14 includes a RAM and a ROM, and is used for storing a program that is to be executed by the CPU 11, and for providing a work area for execution of a program by the CPU 11. The input/output section 15 is used for communication with a manager of the earthquake information providing site 1 and external communication via a leased line, telephone line, or the like.

The CPU 11 executes a program stored in the memory 14 or the like, and controls the respective sections if necessary. With this arrangement, various function blocks can be realized in the earthquake providing site 1 of the present embodiment, and the respective sections can cooperate as the earthquake information providing site 1. The CPU 11 realizes the later-described functional blocks by executing corresponding programs stored in the memory 14 or the like and controlling a peripheral device(s) as needed.

Figure 4:
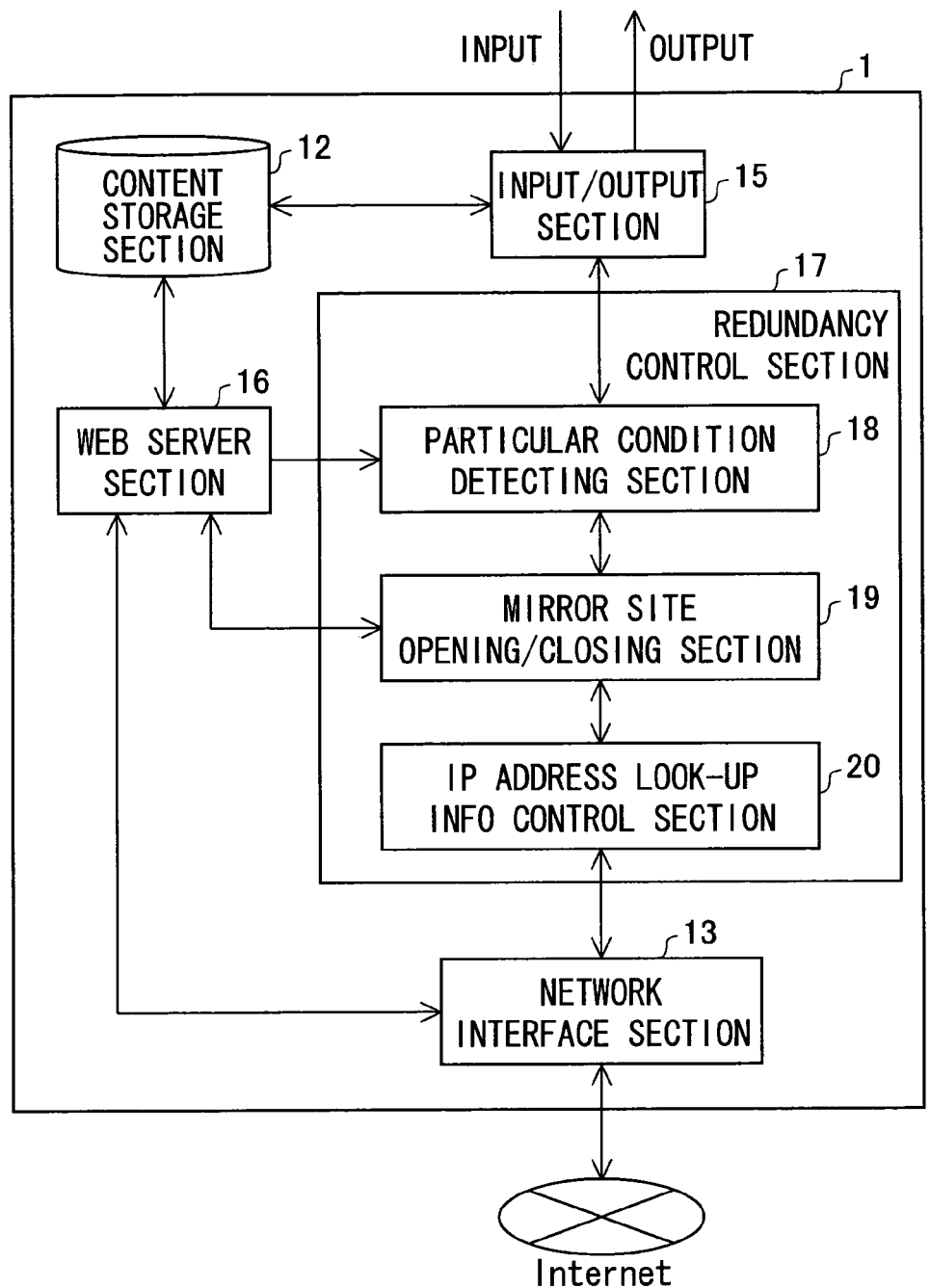
FIG. 4 is a functional block diagram of the earthquake information providing site 1 of the first embodiment according to the present invention.

Moreover, FIG. 4 illustrates a functional block diagram of the earthquake information providing site 1.

The earthquake information providing site 1 is provided with a Web server section 16 and a redundancy control section 17, which are functional blocks. The redundancy control section 17 includes a specific condition detecting section 18, a mirror site opening/closing section 19, and an IP address look-up information control section 20.

In response to a request from a given Web client via the Internet, the Web server section 16 sends, via the network interface section 13, a given content to the Web client that requests for the given content. The content thus sent from the Web server section 16 may be a content stored in the content storing section 12 or a content created in response to a request from the Web client. In accordance with an instruction from the mirror site opening/closing section 19, the Web server section 16 transmits to the mirror site 5 the content(s) stored in the content storing section 12 and a program that allows the mirror site 5 to function as a Web server.

The specific condition detecting section 18 detects whether or not a specific condition occurs that would lead to an increase in accesses to the earthquake information providing site 1. The detection is based on information, which may be information regarding a seismic intensity from a seismograph connected to the earthquake information providing site 1, information obtained from an authority or institution monitoring earthquakes, information inputted via the input/output section 15 by the manager of the earthquake information providing site 1, information being given from the Web server section 16 and notifying a sudden increase of accesses, or the like information. If a specific condition occurs, then the specific condition detecting section 18 instructs the mirror site opening/closing section 19 to open the mirror site 5. If the specific condition disappears, then the specific condition detecting section 18 instructs the mirror site opening/closing section 19 to close the mirror site 5.

The mirror site opening/closing section 19 opens and closes the mirror site 5 in accordance with the instruction of the specific condition detecting section 18. In order to open the mirror site 5, the mirror site opening/closing section 19 instructs the computer that will serves as the mirror site 5, to prepare for the creation of the mirror site 5, and instructs the Web server section 16 to transmits to the computer the content(s) stored in the content storing section 12 and the Web server program. After the mirror site opening/closing section 19 receives, from the control section 40 of the broadcasting station 4, a notice that informs the completion of the transmission of erasing instruction, the mirror site opening/closing section 19 instructs the mirror site 5 to close down.

The IP address look-up information control section 20 creates the IP address look-up information 10, based on the information that shows association between the FQDN and IP address of the earthquake information providing site 1, and information that shows the association between the FQDN of the earthquake information providing site 1 and the IP address of the mirror site 5. Moreover, the IP address look-up information control section 20 notifies the broadcast station 4 of the created IP address look-up information 10. How to notifies the broadcast station 4 of the information is not particularly limited. That is, the notification may be carried out by an E-mail, HTTP protocol, or a proprietary protocol via the Internet, or the notification may be carried out by an E-mail, HTTP protocol, or a proprietary protocol via a leased line or a telephone line.

<IP Address Look-Up Information 10>

The IP address look-up information 10 shows the association between the FQDN of the earthquake information providing site 1 and the IP addresses of the earthquake information providing site 1 and mirror site 5. The IP address look-up information 10 is broadcast from the broadcast station 4 and received by the portable telephones 2. Based on the IP address look-up information 10, an IP address 32 is created/updated, which is used for local name resolution.

FIG. 5(a) illustrates an example of a format that shows association of the FQDN (earthquake-infor.com) of the earthquake information providing site 1 and its IP address (192.168.0.1) and IP addresses (192.168.0.2, 192.168.0.3, 192.168.0.4) of the mirror sites 5, which are opened. The "+" symbols in front of the IP addresses indicates that the look-up data of the IP address look-up information 10 is to be added to the IP table of the portable telephone 2 when the IP address look-up information 10 is received by the portable telephone 2 via the broadcast station 4.

Moreover, FIG. 5(b) illustrates an example of a format that shows association of the FQDN (earthquake-infor.com) of the earthquake information providing site 1 and its IP address (192.168.0.1) and IP addresses (192.168.0.2, 192.168.0.3, 192.168.0.4) of the mirror sites 5, which are closed. The "-" symbols in front of the IP addresses indicates that the look-up data of the IP address look-up information 10 is to be erased from the IP table of the portable telephone 2 when the IP address look-up information 10 is received by the portable telephone 2 via the broadcast station 4.

The format of the IP address look-up information 10 is not particularly limited, provided that the contents of the format of the IP address look-up information 10 created by the IP address look-up information control section 20 can be understood by the portable telephones 2.

<Mirror Site 5>

The computer to serve as the mirror site 5 may be a computer which is leased on time base from an Internet data center only when the specific condition occurs, or may be a computer used for another purpose normally and connected to the Internet. Moreover, the Web server program for causing the computer to function as the mirror site 5 may be stored in the computer in advance and activated according to an instruction from the mirror site opening/closing section 19. Furthermore, the Web server program may be copied from the earthquake information providing site 1 in accordance from the instruction from the mirror site opening/closing section 19, and then activated.

Moreover, the mirror site(s) 5 may be opened in a predetermined number or in such a manner that a predetermined number of the mirror site(s) 5 is opened first and then the number of the mirror site(s) 5 is increased according to an increase in the load on the earthquake information providing site 1.

The mirror site 5 may be closed down automatically when the mirror site 5 receives the instruction to close from the mirror site opening/closing section 19 of the earthquake information providing site 1, or may be closed manually by a manager of the internet data center.

<Arrangement of Broadcast Station 4>

Figures 5, 6:
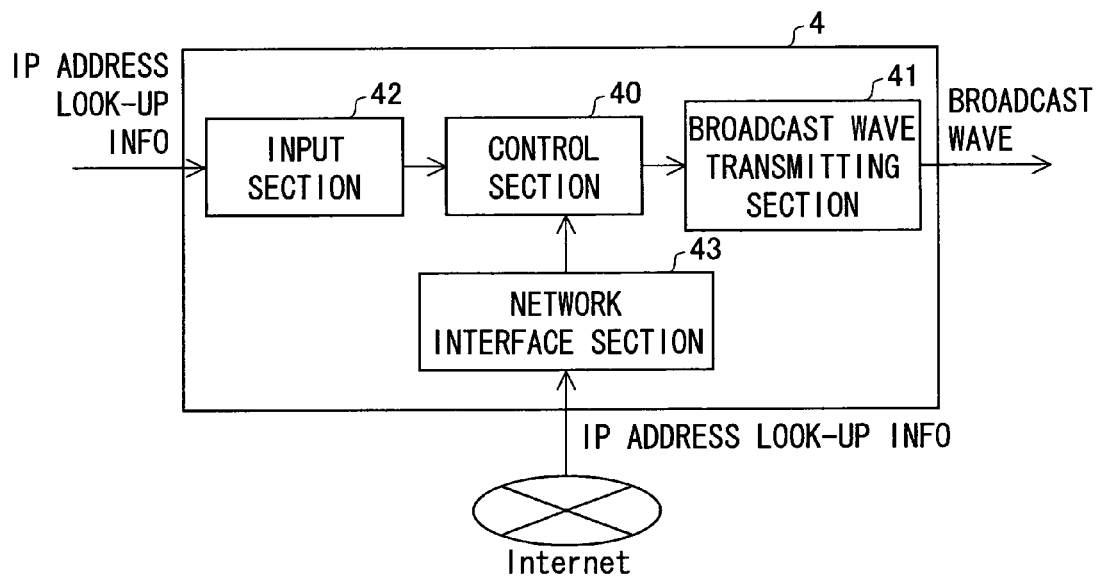
FIG. 6 is a block diagram of a broadcast station 4 of the first embodiment according to the present invention.

FIG. 6 is a block diagram illustrating an arrangement of the broadcast station 4.

The broadcast station 4 is provided with a control section 40, a broadcast wave transmitting section 41, an input section 42, a network interface section 43.

The control section 40 controls the input section 42, the network interface section 43, and the broadcast wave transmitting section 41. The control section 40 receives the IP address look-up information 10 from the IP address look-up information control section 20 of the earthquake information providing site 1 by an E-mail, HTTP protocol, or proprietary protocol via the input section 42 through the leased line or telephone line, or via the Internet interface section 43 through the Internet. The control section 40 transmits the received IP address look-up information 10 to the portable telephone 2 from the broadcast wave transmitting section 41. After the transmission of the IP address look-up information 10, the control section 40 notifies the mirror site opening/closing section 19 of the earthquake information providing site 1 via the input section 42 or the network interface section 43 that the transmission of the IP address look-up information 10 was completed.

The broadcast wave transmitting section 41 may encode the IP address look-up information 10 and transmit the encoded IP address look-up information 10 superimposed on normal television broadcast or radio broadcast. Moreover, the transmission of the encoded IP address look-up information 10 superimposed on normal television broadcast or radio broadcast by the broadcast wave transmitting section 41 may be carried out after an emergency alert signal is transmitted to the portable telephones 2 by using a system of the emergency alert broadcast, thereby to turn the portable telephones 2 into a receiving state. As long as the portable telephones 2 can extract the IP address look-up information 10 from the broadcast wave, the broadcasting may be analog broadcasting or digital broadcasting. The broadcast wave transmitting section 41 is provided with an antenna for television broadcast or radio broadcast. The emergency alert broadcast is such a system that the emergency alert signal is transmitted from a broadcast station, and a receiver is automatically turned into the receiving state from a standby state in response to the emergency alert signal, so that the receiver can receive the emergency alert broadcast that is broadcast thereafter.

The input section 42 may receive the IP address look-up information 10 via a leased line or a telephone line. Furthermore, the IP address look-up information 10 may be manually inputted by the manager of the broadcast station 4.

The network interface section 13 may be constituted by a network interface card (NIC) or the like, and is used for the Internet communication. In case where the IP address look-up information 10 is notified from the earthquake information providing site 1 via the Internet, the network interface section 13 receives the IP address look-up information 10 from the earthquake information providing site 1.

<Arrangement of Portable Telephone 2>

Figure 7:
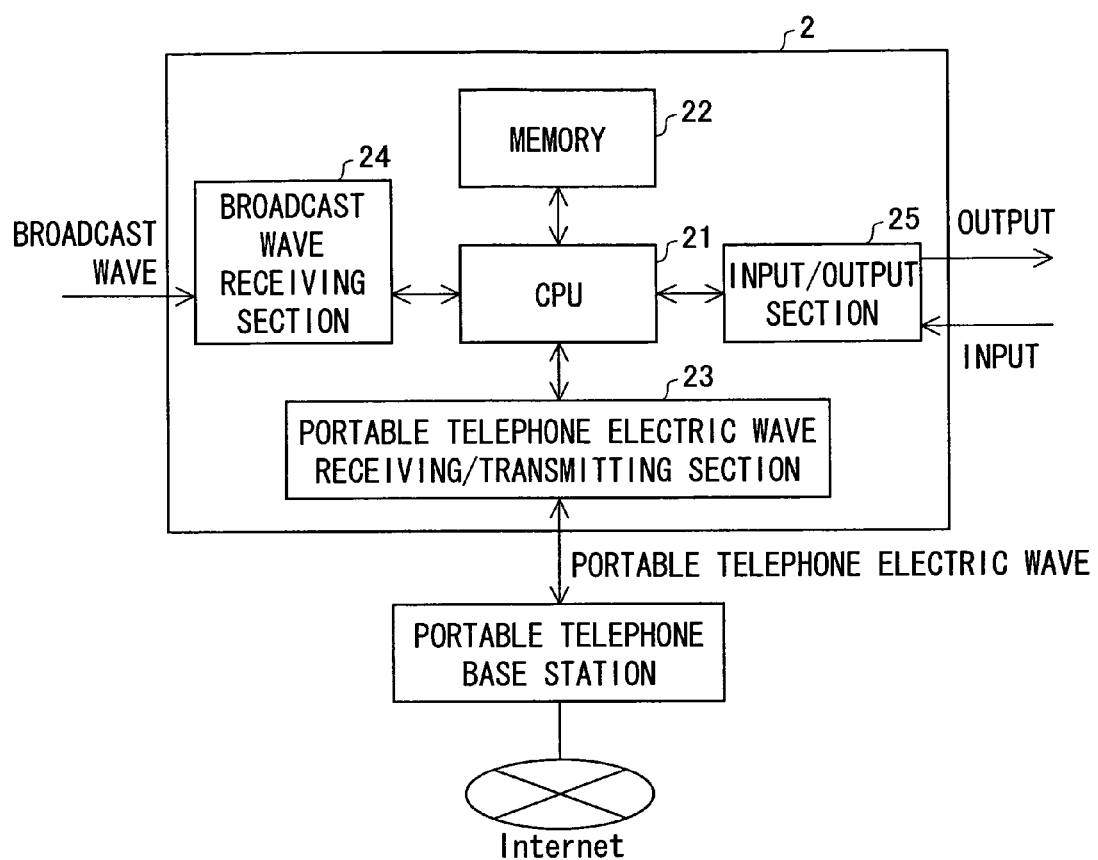
FIG. 7 is a block diagram of the portable telephone 2 of the first embodiment according to the present invention.

The arrangement of the portable telephone 2 is illustrated in a block diagram of FIG. 7.

The portable telephone 2 is provided with a CPU 21, a memory 22, a portable-telephone electric wave receiving/transmitting section 23, a broadcast wave receiving section (broadcast wave receiving means) 24, and an input/output section 25.

The CPU 21 realizes respective functional blocks later described. The memory 22 is provided with a RAM an ROM, and used for storing a program that is to be run on the CPU 21, and for providing a work area for the program run on the CPU 21.

The portable telephone electric wave transmitting/receiving section 23 is provided with an antenna, and is used for data communication and reception of multimedia contents. A base station of the portable telephone 2 is connected to the Internet. Thus, the portable telephone 2 can access to the Internet.

The broadcast wave receiving section 24 is provided with an antenna for receiving broadcast. The broadcast wave receiving section 24 receives the encoded IP address look-up information 10 from the broadcast station 4 via the antenna, and decodes the received IP address look-up information 10. The broadcast wave receiving section 24 may be supplied with power all time so that the broadcast wave receiving section 24 will be in the receiving state, or may be in the standby state normally and turned into the receiving state only when the emergency alert signal is received. In the latter arrangement, the broadcast station 4 should transmit the emergency alert signal before transmitting the IP address look-up information 10. However, the latter arrangement reduces power consumption of the portable telephone 2 because it is only required to supply the broadcast wave receiving section 24 of the portable phone 2 with a power enough to keep the standby state. In case where the IP address look-up information 10 is transmitted from the broadcast station 4 without being encoded, the broadcast wave receiving section 24 does not need to decode the IP address look-up information 10 that it received.

The input/output section 25 is provided with a liquid crystal display screen and speaker, or the like unit for presenting an output (image and/or sound) from the portable telephone 2 to the user thereof. Moreover, the input/output section 25 is also provided with input keys for receiving an input from the user of the portable telephone 2, and a microphone or the like.

The CPU 21 controls these sections as necessary by running a program stored in the memory 22 or the like. As a result, the portable telephone 2 of the present embodiment can realize various functional blocks and operate the sections thereof. The CPU 21 realizes the later-described functional blocks by running a corresponding program stored in the memory 22 or the like and controlling necessary peripheral device.

Figure 8:
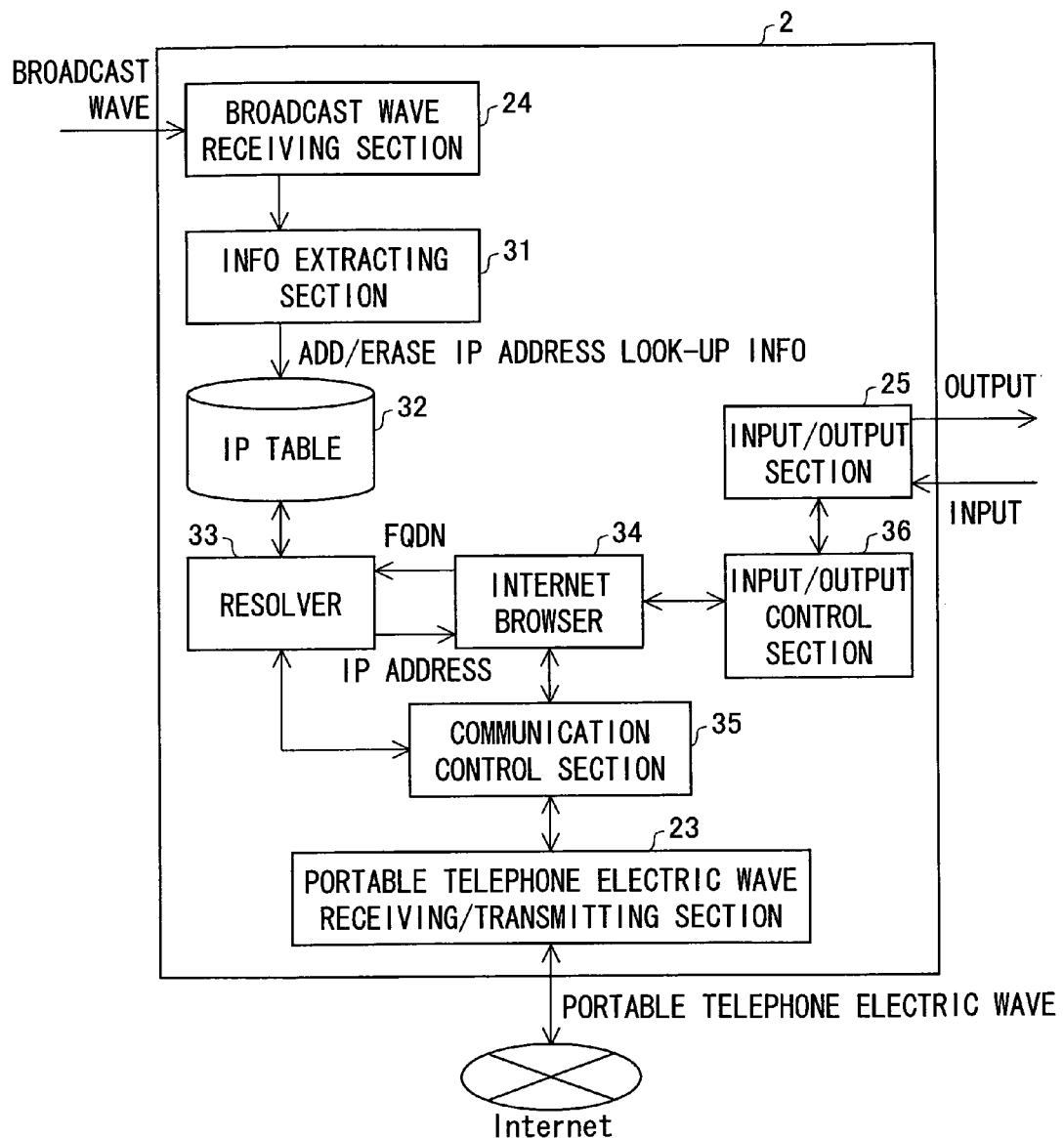
FIG. 8 is a functional block diagram of the portable telephone 2 of the first embodiment according to the present invention.

Moreover, FIG. 8 is a functional block diagram of the portable telephone 2.

The portable telephone 2 is provided with, as functional blocks, an information extracting section (information extracting means) 31, an IP table (site name-access address look-up table) 32, a resolver (name resolution means) 33, an Internet browser (browsing means) 34, a communication control section 35, and an input/output control section 36.

The information extracting section 31 interprets the IP address look-up information 10 received by the broadcast wave receiving section 24. Then, the information extracting section 31 updates the IP table 32 in accordance with an instruction to add/erase a association of an FQDN and an IP address of a particular site. If the instruction is to add the association, then the information extracting section 31 adds the FQDN and the IP address to the IP table 32. If the instruction is to erase the association, then the information extracting section 31 erases the FQDN and the IP address from the IP table 32.

The IP table 32 is used for local name resolution, that is, to find out an IP address of a site on the Internet from an FQDN thereof, e.g., for accessing to the site. That is, the IP table 32 corresponds to the hosts files in UNIX (registered trademark) and Windows XP (registered trademark). The host files are used for local name resolution. The IP table 32 describes the association of the FQDNs and the IP addresses respectively corresponding thereto.

The resolver 33 performs name resolution by using the IP table 32 the DNS server 3 on the Internet in response to a name inquiry form the Internet browser 34. In the portable telephone 2 of the present embodiment, the resolver 33 may be integrated with the Internet browser 34 or may be another application, or may be one layer implemented on the TCP/IP protocol stack. The resolver 33 carries out the name resolution such a way that the resolver 33 looks up the IP table 32, and if the name resolution cannot be done by looking up the IP table 32, makes a name inquiry to the DNS server 3.

The Internet browser 34 acquires an HTML file or the like at an URI designated by the user of the portable telephone 2. The Internet browser 34 acquires the HTML file or the like by HTTP protocol or the like by using the input/output section 25 and the input/output control section 36 via the communication control section 35. Moreover, the Internet browser 34 presents contents of the acquired HTML file or the like to the user of the portable telephone 2 via the input/output control section 36 and the input/output section 25. For the name resolution of the FQDN in the specified URI, a name inquiry is made to the resolver 33.

Via the portable telephone electric wave transmitting/receiving section 23, the communication control section 35 performs communication with the site of the IP address designated by the Internet browser 34. The TCP/IP protocol stack or the like is implemented on the communication control section 35.

The input/output control section 36 controls the input/output section 25. Moreover, the input/output control section 36 receives an input from the input/output section 25 and forwards the input to the Internet browser 34. Further, the input/output control section 36 receives an output from the Internet browser 34 and forwards the output to the input/output section 25.

<Procedure of Accessing to Earthquake Information Providing Site 1 from Portable Telephone 2 in Normal Situation>

Figure 9:
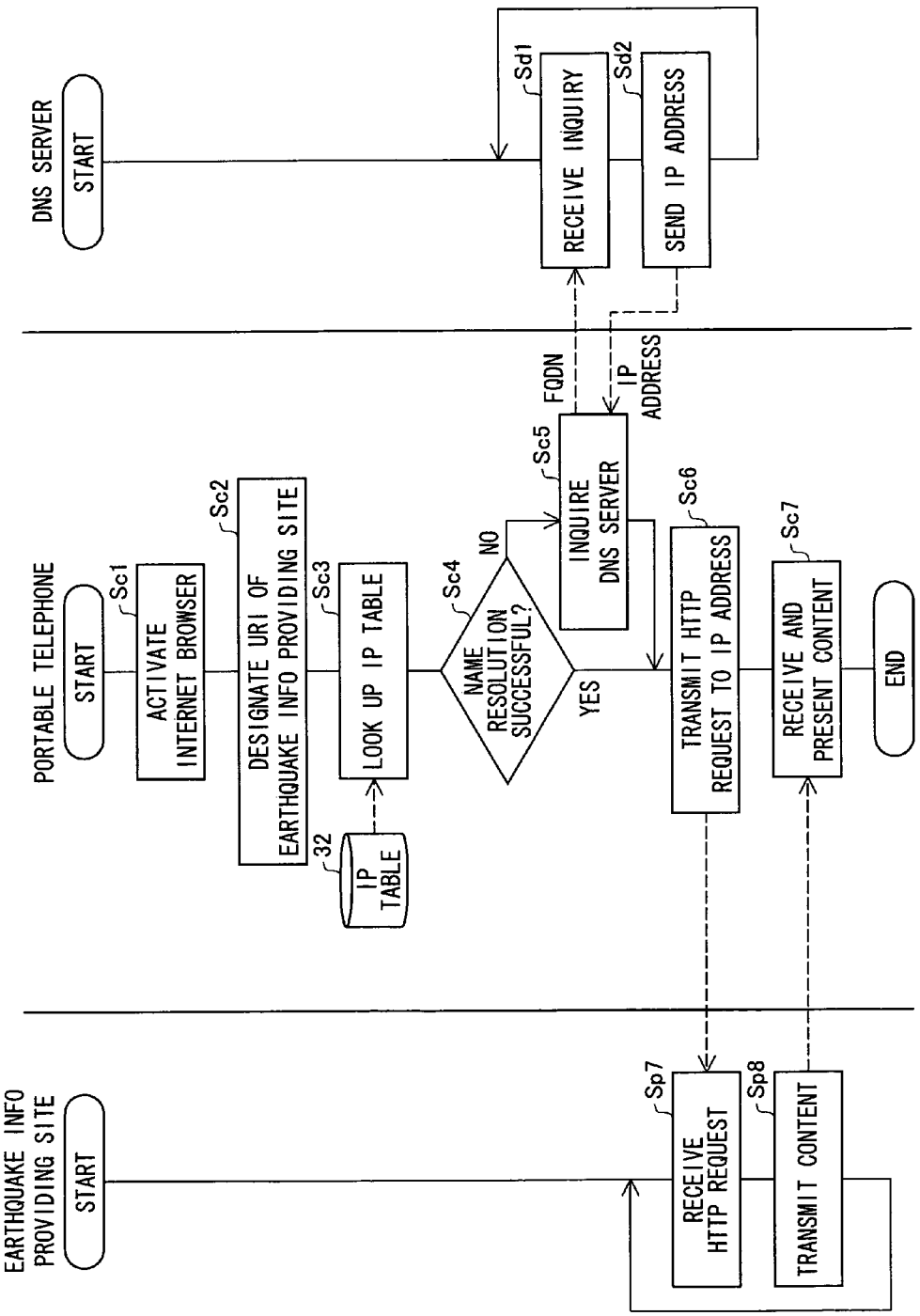
FIG. 9 is a flowchart illustrating a procedure of accessing to the earthquake information providing site 1 from the portable telephone 2 in the normal state in the first embodiment according to the present invention.

Referring to a flowchart of FIG. 9, the procedure of accessing to the earthquake information providing site 1 from the portable telephone 2 in the normal situation is described below. The portable telephone 2, DNS server 3, and the earthquake providing site 1 are explained in this order.

The process as to the portable telephone 2 is as follows.

To begin with, the input/output control section 36 of the portable telephone 2 receives from the user thereof via the input output section 25 an instruction to activate the Internet browser 34. Then, the input/output control section 36 activates the Internet browser 34 (step c1; hereinafter steps performed by the portable telephone 2 is abbreviated as Scx (such as Sc1))

Then, the internet browser 34 receives, from the user of the portable telephone 2 via the input/output section 25 and the input/output control section 36, an instruction to access to the earthquake information providing site 1 (Sc2). At Sc2, FQDN of the earthquake information providing site 1 (www.earthquake-infor.com) is inputted or selected.

After that, the Internet browser 34 instructs the resolver 33 to perform the name resolution from the earthquake information providing site 1 to find the corresponding IP address. The resolver 33 performs the name resolution of the FQDN of the earthquake information providing site 1 by looking up the IP table 32 (Sc3). The name resolution using the IP table 32 by the resolver 33 will be described later.

Then, the resolver 33 finds out whether the name resolution referring to the IP table 32 is successful or not.

If the name resolution is successful, then the procedure goes to Sc6.

If the name resolution is unsuccessful, then the procedure goes to Sc5. In the normal situation, the FQDN of the earthquake information providing site 1 and the corresponding IP address thereof are not registered on the IP table 32. Thus, the name resolution at Sc3 is unsuccessful in the normal situation.

If the name resolution is unsuccessful, the revolver 33 instructs via the communication control section 35 and the portable telephone electric wave transmitting/receiving section 23 the externally-provided DNS server 3 to perform name resolution, thereby acquiring the IP address of the earthquake information providing site 1 (192.168.0.1) from the DNS server 3 (Sc5).

After that, the Internet browser 34 sends an HTTP request to the earthquake information providing site 1 via the communication control section 35 and the portable telephone electric wave transmitting/receiving section 23 by using the IP address acquired by the name resolution (Sc6).

Then, the Internet browser 34 receives a content from the earthquake providing site 1 via the portable telephone electric wave transmitting/receiving section 23 and the communication control section 35, and presents the received content to the user of the portable telephone 2 via the input/output control section 36 and the input/output section 25 (Sc7).

The procedure performed by the DNS server 3 is as follows:

Firstly, the DNS server 3 receives, from the resolver 33, an inquiry regarding the name resolution. (Hereinafter, steps performed by the DNS server 3 are abbreviated as Sdx (such as Sd1)). The resolver 33 sends to the DNS server 3 the inquiry regarding the name resolution if the resolver 33 instructs the DNS server 3 to perform the name resolution at Sc5 because it is judged at Sc4 that the name resolution is unsuccessful.

Then, the DNS server 3 performs the name resolution for FADN (www.earthquake-infor.com) by searching across a DNS cache and recursive inquiry, which are general operation performed by DNS servers. Then, the DNS server 3 sends back the IP address (192.168.0.1) (the result of the name resolution) to the resolver 33 (Sd2).

The procedure performed by the earthquake information providing site 1 is as follows.

To begin with, the Web server section 16 receives the HTTP request from the Internet browser 34 via the network Interface section 13 (Sp8; hereinafter steps performed by the earthquake information providing site 1 are abbreviates as Spx (such as Sp8). The Web server section 16 receives the HTTP request in case where the Internet browser 34 sends the HTTP request to the earthquake information providing site 1.

After that, the Web server section 16 acquires, from the content storage section 12, a content (such as HTML file) requested by the HTTP request. Alternatively, the Web server section 16 generates the content. The Web server section 16 sends the acquired or generated content to the Internet browser 34 via the network interface section 13 (Sp8).

<Creation of Mirror Site when Earthquake Occurred, and Procedure of Updating IP Table 32>

Figure 10:
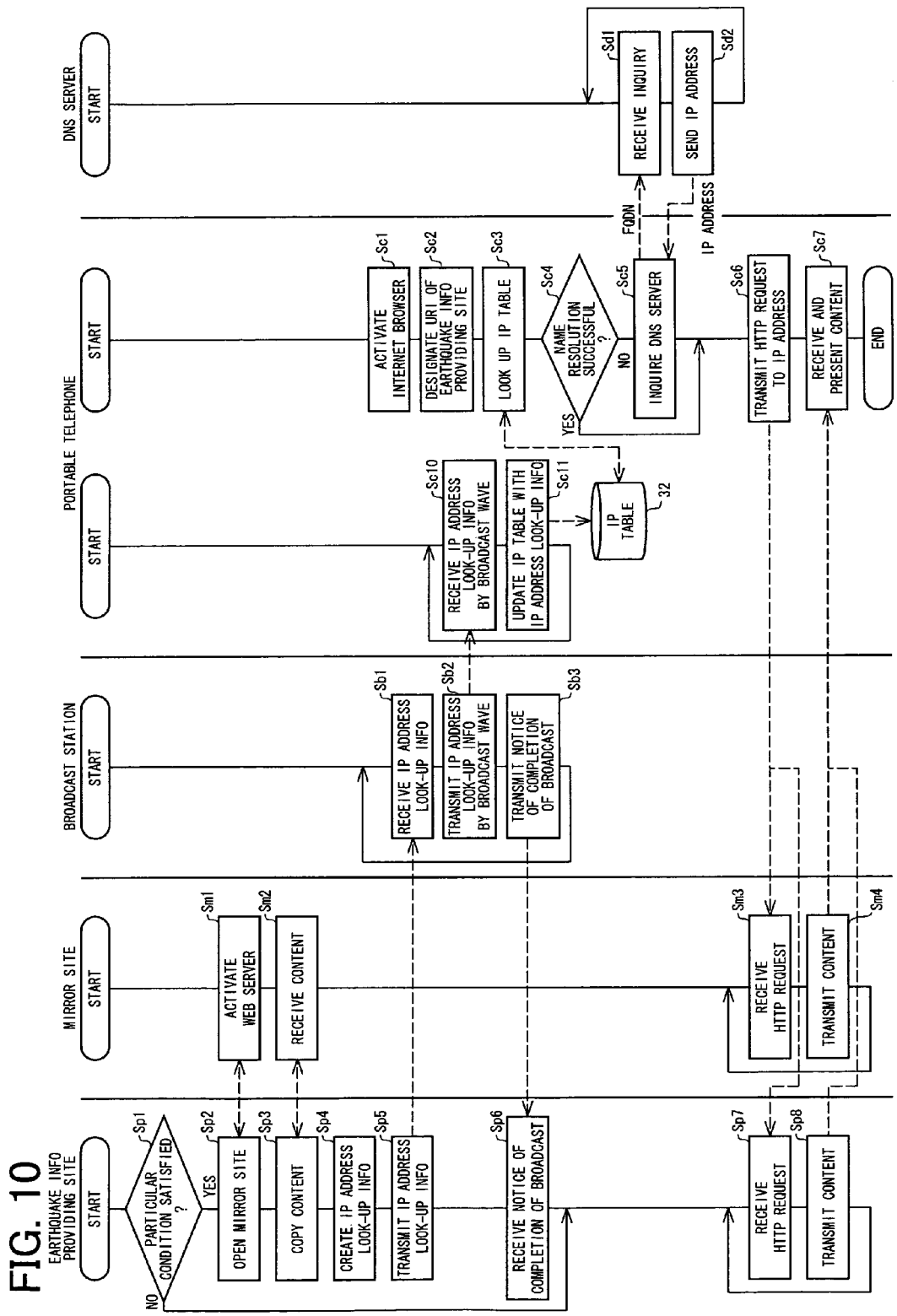
FIG. 10 is a flowchart illustrating procedures of opening the mirror site 5, updating the IP table 32, and accessing from the portable telephone 2 to one of the earthquake information providing site 1 and the mirror sites 5, after an earthquake occurred.

Referring to the flowchart in FIG. 10, the creation of the mirror site 5 when an earthquake occurred, and the procedure of updating the IP table 32 are described below in the order of the earthquake information providing site 1, the mirror site 5, the broadcast station, and the portable telephone 2. The description refers to center and left-upper parts of the flowchart of FIG. 10.

The procedure of the earthquake information providing site 1 is as follows:

To begin with, the specific condition detecting section 18 determines whether a particular condition is satisfied or not (Sp1). Examples of the satisfaction of the particular condition are the occurrence of the earthquake, an increase of the accesses to the earthquake information providing site 1, and the like.

If the particular condition is satisfied, the procedure goes to Sp2.

If the particular condition is not satisfied, the procedure goes to Sp6.

If the particular condition is satisfied, the mirror site opening/closing section 19 transmits, to a computer that is ready to be the mirror site 5, an instruction to open the mirror site 5 (Sp2). For example, suppose three mirror sites 5 are to be opened, the first mirror site 5 has an IP address of 192.168.0.2, the second mirror site 5 has an IP address of 192.168.0.3, and the third mirror site 5 has an IP address of 192.168.0.4.

Next, the mirror site opening/closing section 19 instructs the Web server section 16 to copy to the mirror sites 5 the content necessary to open the mirror sites 5. The Web server section 16 acquires from the content storage section 12 the content necessary for the mirror sites 5, and transmits the content to the mirror sites 5 (Sp3). If the mirror site 5 does not have the Web server program yet, the Web server program is also sent to the mirror site 5 in addition to the content.

Then, the IP address look-up information control section 20 creates IP address look-up information 10 that indicates the association of the FQDN of the earthquake information providing site 1 (www.earthquake-infor.com) and the IP address thereof (192.168.0.1) and the IP addresses of the mirror sites 5 (192.168.0.2, 192.168.0.3, and 192.168.0.4). As illustrated in the example illustrated in FIG. 5(*a*), the IP address look-up information 10 thus generated is such that symbol "+" is added in front of the IP address to be registered. The symbol "+" indicates that the association of the FQDN and the IP address with the symbol is to be registered.

Then, the IP address look-up information control section 20 sends the generated IP address look-up information 10 to the broadcast station 4 via the network interface section 13 or the input/output section 15 (Sp5).

After that, the IP address look-up information control section 20 receives a notice of completion of the broadcast (Sp6). This notice notifies the completion of the broadcast of the IP address look-up information 10.

The procedure performed by the mirror site 5 is as follows:

Moreover, the computer of the mirror site 5 receives an instruction to open the mirror site 5, the instruction having been transmitted thereto from the mirror site opening/closing section 19. If the mirror site 5 already has the Web server program, the mirror site 5 activates the Web server program (Sm1; hereinafter, steps performed by the mirror sit 5 are abbreviated as Smx (such as Sm1)).

Then, the mirror site 5 acquires the content necessary for opening a mirror site, the content having been transmitted thereto from the Web server (Sm2). The acquisition of the content completes the opening of the mirror site 5, thereby causing the mirror site 5 to be ready for receiving the HTTP request from the Internet browser 34 of the portable telephone 2.

The procedure performed by the broadcast station 4 is as follows.

Firstly, the control section 40 receives the IP address look-up information 10 transmitted thereto from the IP address look-up information section 20 of the earthquake information providing site 1 via the input section 42 or the network interface section 43 (Sb1; hereinafter steps performed by the broadcast station 4 are abbreviated as Sbx (such as Sb1).

After that, the control section 40 broadcasts the received IP address look-up information 10 to the portable telephone 2 via the broadcast wave transmitting section 41 (Sb2).

Then, the control section 40 notifies the IP address look-up information control section 20 of the completion of the broadcast of the IP address look-up information 10 (Sb3).

The procedure performed by the portable telephone 2 is as follows.

Firstly, the information extracting section 31 receives the IP address look-up information 10 broadcast by the broadcast station 4 (Sc10). In case where the IP address look-up information 10 is encoded, the broadcast wave receiving section 24 decodes the IP address look-up information 10.

After that, the information extracting section 31 updates the IP table 32 with the association of the FQDN of the earthquake information providing site 1 and the IP addresses of the earthquake information providing site 1 and the mirror sites 5 by reference to the received IP address look-up information 10 in which the association is contained (Sc11). That is, the association is registered on the IP table 32 by the information extracting section 31. The IP table 32 relates the FQDN (www.earthquake-infor.com) of the earthquake information providing site 1 to IP address 192.168.0.1, IP address 192.168.0.2, IP address 192.168.0.3, and IP address 192.168.0.4, respectively.

<Procedure of Accessing to Earthquake Information Providing Site 1 from Portable Telephone 2 when Earthquake Occurred>

Referring to the flowchart of FIG. 10, the procedure of accessing to the earthquake information providing site 1 from the portable telephone 2 in the case of earthquake is described below in the order of the portable telephone 2, mirror site 5, and earthquake information providing site 1. The description refers to the lower and right parts of the flowchart of FIG. 10.

The procedure of the portable telephone 2 is as follows:

The steps from Sc1 to Sc3 are identical with those of the procedure of accessing to the earthquake information providing site 1 from the portable telephone 2 in the normal situation. Thus, their explanation is omitted here.

Then, by reference to the IP table 32, the resolver 33 determines whether the name resolution is successful or not (Sc4). In the following explanation, it is supposed that the updating of the IP table 32 for the case where the earthquake occurs has been completed. Therefore, the FQDN of the earthquake information providing site 1 and the IP address of the earthquake information providing site 1 and the mirror sites 5 have been registered on the IP table 32 already. Thus, the name resolution referring the IP table 32 is successfully done. So, the procedure goes to Sc6.

Then, the Internet browser 34 obtains one IP address via the name resolution (one of 192.168.0.1, 192.168.0.2, 192.168.0.3, and 192.168.0.4). Then, via the communication control section 35 and the portable telephone wave transmitting/receiving section 23, the Internet browser 34 transmits the HTTP request to that one of the earthquake information providing site 1 and the mirror sites 5 which has this IP address (Sc6).

After that, the Internet browser 34 receives the content sent back from the one of the mirror sites 5 and the earthquake information providing site 1 via the portable telephone electric wave transmitting/receiving section 23 and the communication control section 35, and then presents the received content to the user of the portable telephone 2 via the input/output control section 36 and the input/output section 25 (Sc7).

If the portable telephone 2 could not receive the IP address look-up information 10 broadcast from the broadcast station 4 in the case of earthquake and thus could not update the IP table 32, the FQDN of the earthquake information providing site 1 would not be registered in the IP table 32 and thus the name resolution by reference to the IP table 32 would be failed. In case the name resolution is unsuccessful, the portable telephone 2 would acquire the IP address (192.168.0.1) of the earthquake information providing site 1 from the DNS server 3 in the same manner as the procedure of accessing to the earthquake information providing site 1 from the portable telephone 2 in the normal situation.

The procedure of the earthquake information providing site 1 is as follows. The steps performed by the mirror site 5 are identical with those performed by the earthquake providing site 1. Sp7 and Sp8 of the earthquake information providing site 1 respectively correspond to Sm3 and Sm4 of the mirror sites 5.

Firstly, the Web server section 16 receives the HTTP request from the internet browser 34 via the network interface section 13 (Sp8; hereinafter, steps performed by the earthquake information providing site 1 are abbreviated as Spx (such as Sp7)). The Web server section 16 receives the HTTP request when the Internet browser 34 transmits the HTTP request to the earthquake information providing site 1.

Then, the Web server section 16 acquires, from the content storage section 12, the content (such as HTML file) requested by the HTTP request. Alternatively, the Web server section 16 generates the content. The Web server section 16 transmits the acquired or generated content to the Internet browser 34 via the network interface section 13 (Sp8).

<Explanation on Name Resolution of Resolver 33>

Figure 11:
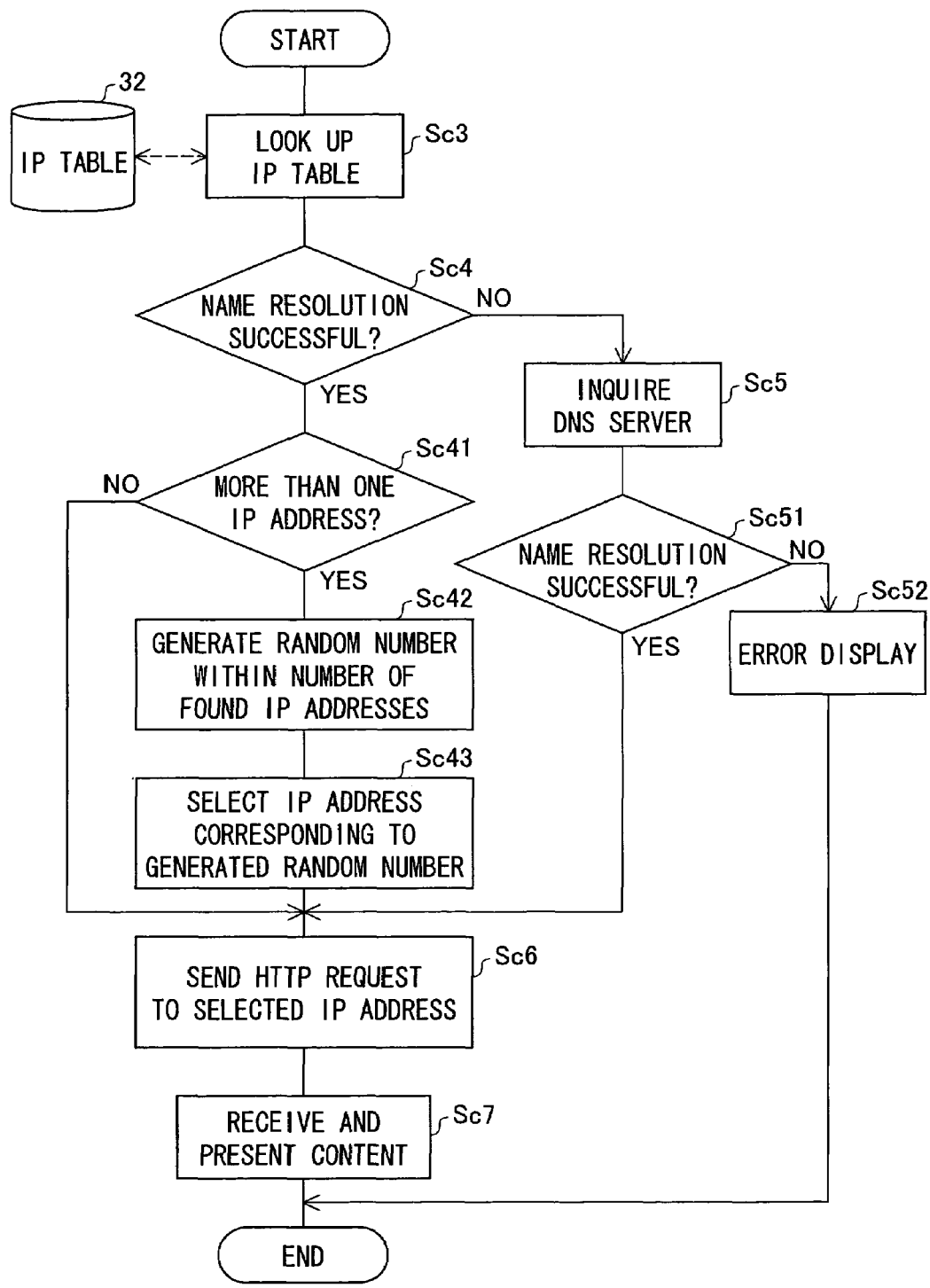
FIG. 11 is a flowchart illustrating procedures of name resolution and random selection of an IP address by a resolver 33 of the portable telephone 2 of the first embodiment of the present invention.

Referring a flowchart of FIG. 11, the name resolution performed by the resolver 33 is described below.

Firstly, the resolver 33 looks up the IP table 32 so as to try the name resolution with the FQDN (www.earthquake-infor.com), which is acquired from the internet browser 34, of the earthquake information providing site 1 (Sc3). Then, the resolver 33 determines whether the name resolution by reference to the IP table 32 is successful (Sc4).

If the name resolution is successful, the procedure goes to Sc41. The name resolution is successfully done if the updating of the IP table 32 in the case of the earthquake has been completed, so that the FADN of the earthquake information providing site 1 and the IP addresses of the earthquake information providing site 1 and the mirror sites 5 are registered on the IP table 32 (that is, the association of www.earthquake-infor.com and 192.168.0.1, the association of www.earthquake-infor.com and 192.168.0.2, the association of www.earthquake-infor.com and 192.168.0.3, and the association of www.earthquake-infor.com and 192.168.0.4 are registered on the IP table 32).

If the name resolution is failed, the procedure goes to Sc5. The name resolution is failed when none of the associations of the FQDN of the earthquake information providing site 1 and the IP addresses is registered on the IP table 32.

If the name resolution is successful, the resolver 33 determines whether more than one association of the earthquake information providing site 1 and the IP address is registered on the IP table 32 or not (Sc41).

If yes, the procedure goes to Sc42.

If not, the procedure goes to Sc6.

If there are more than one association, the resolver 33 generates a natural random number within a range of from 1 to the number of the associations (Sc42). For example, if there were three mirror sites, there would be four associations including the association of the earthquake information providing site 1, and thus the random number would be any one of 1, 2, 3, and 4.

Next, the resolver 33 selects one IP address corresponds to the generated random number (Sc43). For example, the correspondence between the random number and the IP addresses may be predetermined as below: If the generated random number was 1, the IP address 192.168.0.1 of the earthquake information providing site 1 is selected; If the generated random number was 2, the IP address 192.168.0.2 of the first mirror site 5 is selected; And if the generated random number was 4, the IP address 192.168.0.4 of the third mirror site 5 is selected. The resolver 33 sends the selected IP address to the Intent browser 34. Then, the procedure goes to Sc6.

If the name resolution was unsuccessful at Sc4, the resolver 33 instructs the externally-provided DNS server 3 via the communication control section 35 and the portable electric wave transmitting/receiving section 23 (Sc5).

Next, the resolver 33 determines whether the name resolution by name inquiry to the DNS server 3 is successful or not (Sc51).

If the name resolution is successful, the procedure goes to Sc6. The name resolution is successfully done when the DNS record regarding the associations of the FQDN of the earthquake information providing site 1 and the IP addresses is stored in the DNS server 3 or an upper-level DNS server.

If the name resolution is failed, the procedure goes to Sc52. The portable telephone 2 presents to the user an error message that tells the name resolution is failed. Then, the procedure is terminated.

The Internet browser 34 transmits the HTTP request to that one of the mirror sites 5 and the earthquake information providing site 1 which has the IP address acquired by the name resolution (Sc6). (In this example, the acquired IP address is any one of 192.168.0.1, 192.168.0.2, 192.168.0.3, or 192.168.0.4 if the name resolution is successfully done by reference to the IP table 32, and the acquired IP address is 192.168.0.1 if the name resolution is successfully done by the externally-provided DNS server 3).

Even if it is determined at Sc41 that there is only one association, the IP address of the only one association is sent from the resolver 33 to the internet browser 34 so as to perform the process of Sc6.

In case where it is determined as Sc51 that the name resolution is successfully done, the resolver 33 has acquired, from the DNS server 3, the IP address (192.168.0.1) associated with the earthquake information providing site 1. Thus, the resolver 33 sends this IP address to the Internet browser 34, so as to perform the process of Sc6.

Next, the internet browser 34 receives the content sent from the mirror site 5 or the earthquake information providing site 1 via the portable telephone electric wave transmitting/receiving section 23 and the communication control section 35. Then, the internet browser 34 presents the received content to the user of the portable telephone 2 via the input/output control section 36 and the input/output section 25 (Sc7).

<Procedure of Closing Mirror Site 5 and Updating IP Table 32 when Normal Situation is Restore>

Figure 12:
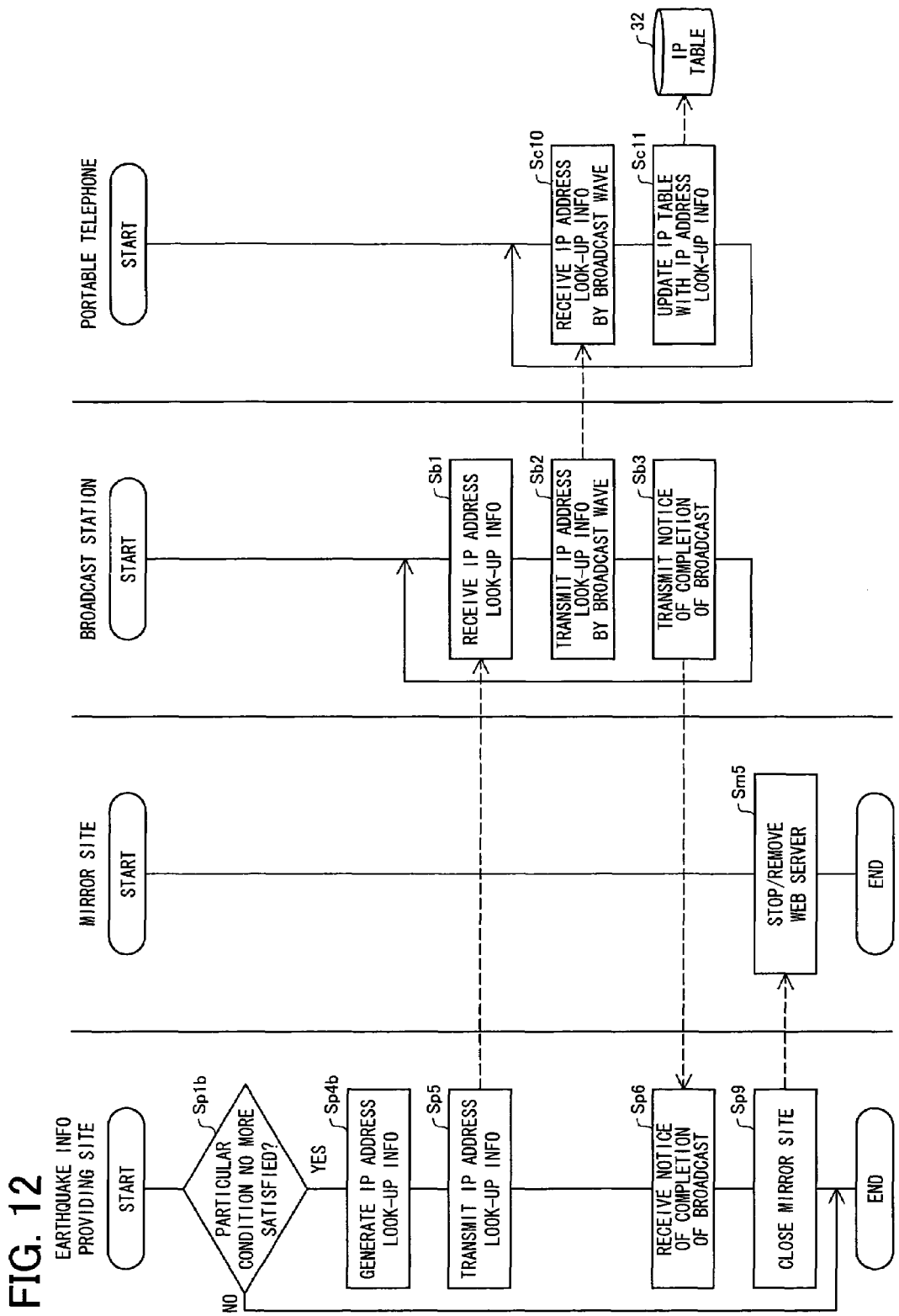
FIG. 12 is a flowchart illustrating procedures of updating the IP table 32 and closing the mirror sites 5 when restoring to the normal state in the first embodiment of the present invention.
Figure 13:
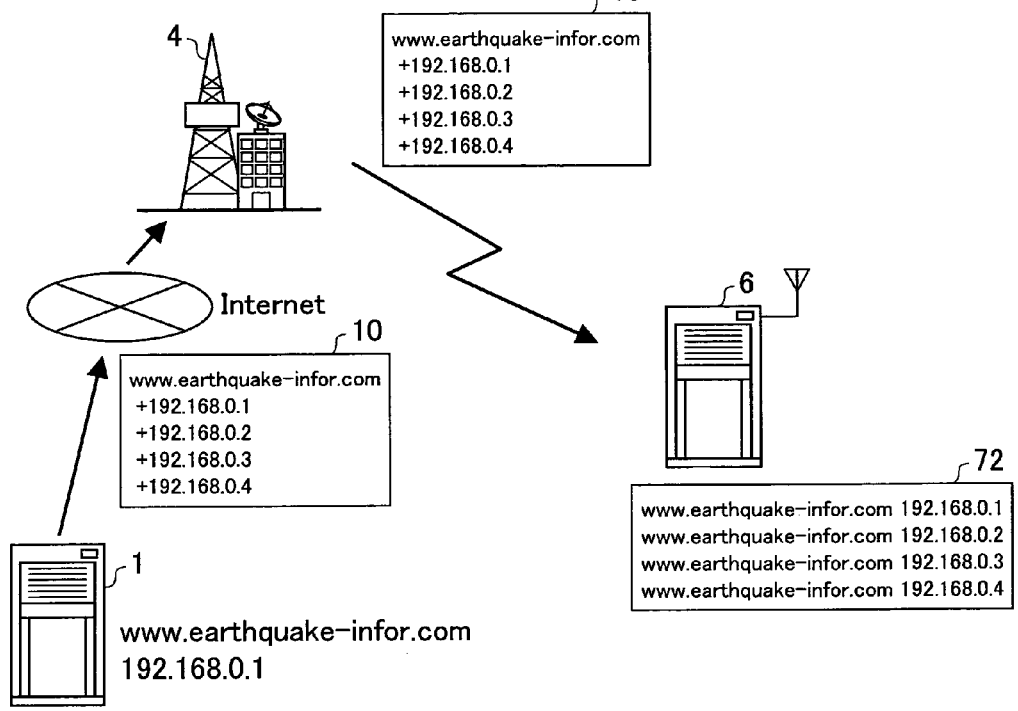
FIGS. 13(a) and 13(b) illustrate a second embodiment of the present invention.
Figure 13:
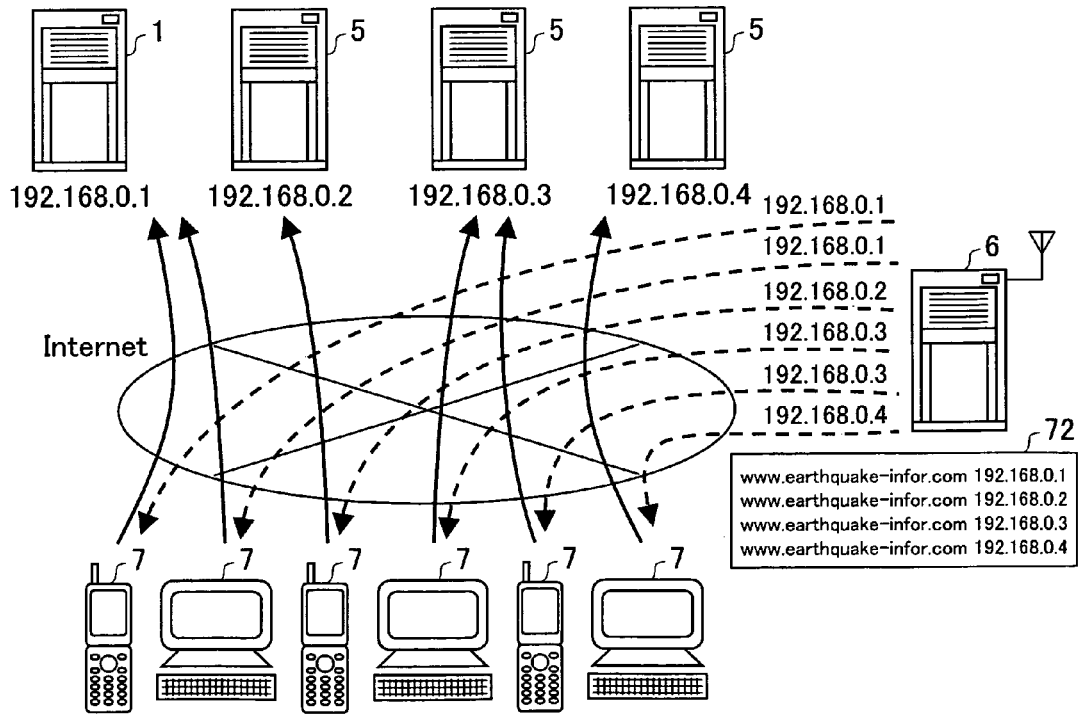

Referring to the flowchart of FIG. 12, the following describes the procedure to be performed when the particular condition is no more satisfied after some time since the occurrence of the earthquake, that is, when the normal situation is restored. When the normal situation is restored, closing the mirror sites 5 and updating the IP table 32 are performed. The following describes the procedures of the earthquake information providing site 1, broadcast station 4, portable telephone 2, and mirror site 5 in this order.

The procedure of the earthquake information providing site 1 is as follows.

Firstly, the specific condition detecting section 18 determines whether the particular condition is no more satisfied or not (Sp1b). Examples of the cases where the particular condition is no more satisfied are: long enough time has been elapsed since the occurrence of the earthquake; sufficient decrease in the accesses to the earthquake information providing site 1 and the mirror sites 5.

If the particular condition is no more satisfied, the procedure goes to Sp4b.

If the particular condition is still satisfied, the procedure is terminated.

If the particular condition is no more satisfied, the IP address look-up information control section 20 generates IP address look-up information 10 that indicates association of the FQDN of the earthquake information providing site 1 and the IP addresses of a mirror site(s) 5 that is/are to be closed (Sp4b). The generated IP address look-up information 10 is such that symbols "-" is added in front of the IP address, as illustrated in the example illustrated in FIG. 5(b). The symbol "-" instructs to erase the association.

Then, the IP address look-up information control section 20 sends the generated IP address look-up information 10 to the broadcast station 4 via the network interface section 13 or the input/output section 15 (Sp5).

After that, the IP address look-up information control section 20 receives from the broadcast station 4 a notice of completion of broadcast. This notice notifies that the broadcast of the IP address look-up information 10 is completed (Sp6).

Then, the mirror site opening/closing section 19 transmits, to the mirror site(s) 5 to be closed, an instruction to close down (Sp9).

The steps performed by the broadcast station 4 are identical with those performed by the broadcast station 4 when the earthquake occurred. Thus, the explanation of the steps is omitted here.

The procedure performed by the portable telephone 2 is as follows.

Firstly, via the broadcast wave receiving section 24, the information extracting section 31 receives the IP address look-up information 10 broadcast from the broadcast station 4. If the IP address look-up information 10 is encoded, the broadcast wave receiving section 24 decodes the IP address look-up information 10.

Then, the information extracting section 31 erases, from the IP table 32, the association(s) of the FQDN of the earthquake information providing site 1 and the IP address(es) of the earthquake information providing site 1 and mirror site(s) 5 contained in the IP address look-up information 10 (Sc11). Here, the associations are an association of www.earthquake-infor.com and 192.168.0.1, an association of www.earthquake-infor.com and 192.168.0.2, an association of www.earthquake-infor.com and 192.168.0.3, an association of www.earthquake-infor.com and 192.168.0.1, an association of www.earthquake-infor.com and 192.168.0.4.

Only the association(s) instructed to erase are erased. In case an association of an FQDN of another information providing site and an IP address thereof is also registered on the IP table 32, this association remains on the IP table until an instruction to erase the association or until a period of validity for this association is expired.

The procedure of the mirror site 5 is as follows.

To begin with, the mirror site 5 receives, from the mirror site opening/closing section 19, an instruction to close the mirror site 5. Then, the mirror site 5 stops the Web server program and close down (Sm5). The closing process of the mirror site 5 such as stopping of the Web server program, erasing of the Web server program and the contents, may be carried out automatically or manually by the manager of the mirror site 5.

Second Embodiment

Referring to FIGS. 13 to 19, one embodiment of the present invention is described. By using a DNS server receiving a broadcast electric wave, the present embodiment prevents concentration of accesses to an information providing site on the Internet.

In the following, it is supposed that a particular event is earthquake and an information providing site for providing information on the particular event is an earthquake information providing site 1. It is supposed that an earthquake occurs and many users of Web clients such as personal computers and portable telephones access to the earthquake information providing site 1.

<Outline>

Figure 14:
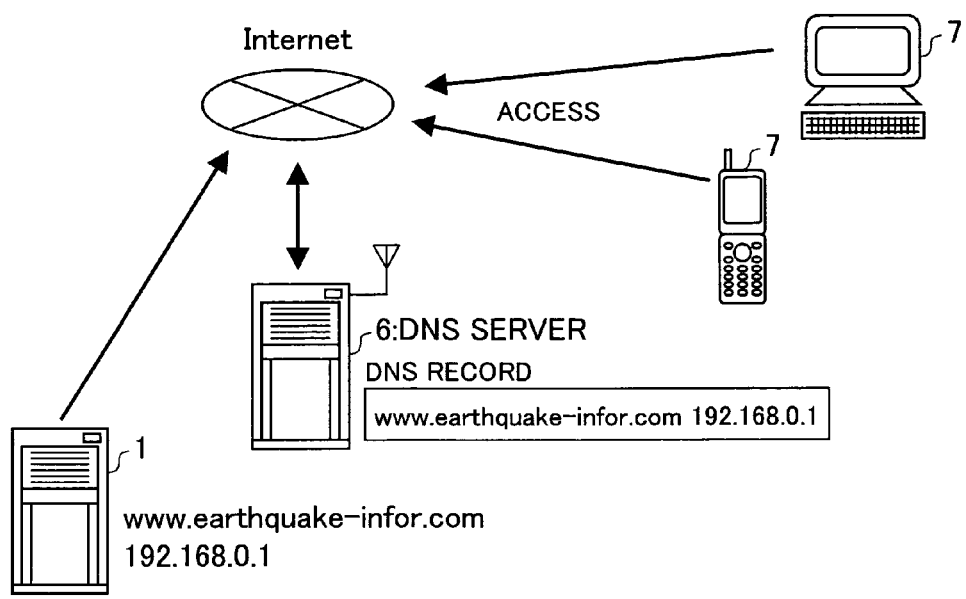
FIG. 14 is a view illustrating access from the Web client 7 to the earthquake information providing site 1 in the second embodiment of the present invention.

FIGS. 13(a), 13(b), and 14 illustrate components of a system of the present invention before and after the earthquake occurs. FIG. 14 illustrates a state before the earthquake occurs. FIG. 13(a) illustrate a state where IP address look-up information 10 for load distribution of accesses is transmitted to a DNS server 6. FIG. 13(b) illustrates a state where the accesses to the earthquake information providing site 1 from the Web clients 7 are distributed to mirror sites 5.

<Outline of Process in Normal State>

In a normal state, accessing from the Web client 7 to the earthquake information providing site 1 via the Internet is carried out as follows. When an URI of the earthquake information providing site 1 is designated, a browser of the Web client 7 makes name inquiry to the DNS server 6 in order to perform name resolution of the URI of the earthquake information providing site 1. Thereby, the Web client 7 acquires, from the DNS server 6, an IP address (192.168.0.1) in association with the FQDN of the earthquake information providing site 1. Then, the browser of the Web client 7 accesses to the earthquake information providing site 1.

The DNS server 6 functions as a general DNS server. That is, the DNS server 6 has a DNS record that indicates the association of the FQDN (www.earthquake-infor.com) and IP address (192.168.0.1) of the earthquake information providing site 1. Thus, the DNS server 6 sends IP address (192.168.0.1) of the earthquake information providing site 1 to the Web client 7. For the sake of easy explanation, a private IP address is used in lieu of a public IP address of the earthquake information providing site 1, as in the first embodiment.

<Outline of Process when Earthquake Occurred>

When an earthquake occurred, the earthquake information providing site 1, a broadcast station 4, and the DNS server 6 performs the following processes.

(1) The earthquake information providing site 1 opens a mirror site 5 to which earthquake information to be provided is copied.

(2) The earthquake information providing site 1 sends to the broadcast station 4 IP address look-up information 10 that indicates association of the FQDN of the earthquake information providing site 1 and an IP address of the mirror site 5, as well as the FQDN and IP address of the earthquake information providing site 1. For example as illustrated in FIG. 13(a), the IP address look-up information 10 describes the FQDN of the earthquake information providing site 1 and the IP address thereof, and IP address of three mirror sites 5 (192.168.0.2, 192.168.0.3, 192.168.0.4).

(3) The broadcast station 4 broadcasts the IP address look-up information 10 that has been supplied from the earthquake information providing site 1 (this state is illustrated in FIG. 13(a)).

(4) The DNS server 6, which received the IP address look-up information 10, randomly selects one IP address out of the IP address of the earthquake information providing site 1 and the IP addresses of the mirror sites 5 when the Web client 7 makes the name inquiry to the DNS server 6 for the IP address of the earthquake information providing site 1. Then, the DNS server 6 sends the selected IP address (one of 192.168.0.1, 192.168.0.2, 192.168.0.3, and 192.168.0.4). The Web client 7 accesses to that one of the earthquake information providing site 1 and the mirror sites 5 which has the IP address (the one of 192.168.0.1, 192.168.0.2, 192.168.0.3, and 192.168.0.4) sent from the DNS server 6 (This state is illustrated in FIG. 13(b)).

<Outline of Process of Restoring to Normal State>

For example, After a sufficient time elapsed since the occurrence of the earthquake, the access amount to the earthquake information providing site 1 decreases and there is no possibility of server down due to overload. Then, the earthquake information providing site 1, the broadcast station 4 and the DNS server 6 perform the following processes:

(1) The earthquake information providing site 1 sends to the broadcast station 4 an instruction (erasing instruction) to erase the IP address look-up information 10 that the DNS server 6 has.

(2) The broadcast station 4 broadcasts, to the DNS server 6, the erasing instruction sent from the earthquake information providing site 1.

(3) The DNS server 6 receives the erasing instruction and erases the IP address look-up information 10.

(4) The broadcast station 4 notifies the earthquake information providing site 1 of completion of broadcast of the erasing instruction.

(5) The earthquake information providing site 1 closes the mirror site 5.

Via these processes, the DNS server 6 returns to the normal state in which the name resolution is performed in response to the name inquiries from the Web client 7. The IP address look-up information 10 may be arranged to have a period of validity so that the DNS server 6 that receives the IP address look-up information 10 after the earthquake occurred but does not receive the erasing instruction can erase the IP address information 10.

<Arrangement of Earthquake Information Providing Site 1>

The earthquake information providing site 1 has the same arrangement as that in the first embodiment. Thus, its explanation is omitted here.

<IP Address Look-Up Information 10>

The IP address look-up information 10 indicates the association of the FQDN of the earthquake information providing site 1 and the IP address thereof and the IP addresses of the mirror sites 5. The IP address look-up information 10 is broadcast from the broadcast station 4 and received by the DNS server 6. An IP table 72 is updated with the IP address look-up information 10. The IP table 72 is for use in name inquiry from the Web client 7.

The IP address look-up information 10 has the same format as that in the first embodiment. Thus, its explanation is omitted here.

<Mirror Site 5>

The mirror sites 5 have the same arrangement as those in the first embodiment. Thus, their explanation is omitted here.

<Arrangement of Broadcast Station 4>

The broadcast station 4 has the same arrangement as that in the first embodiment, except that the broadcast station 4 broadcasts to the DNS server 6 instead of the portable telephone 2. Thus, its explanation is omitted here.

<Arrangement of DNS Server 6>

Figure 15:
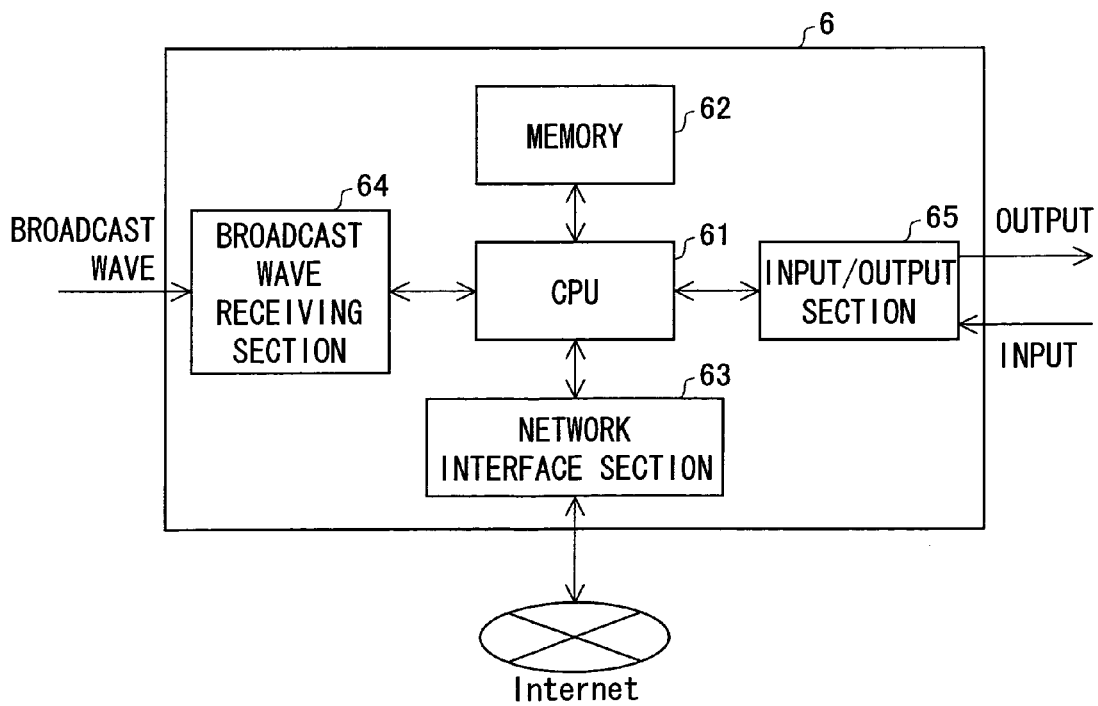
FIG. 15 is a block diagram of the DNS server 6 according to the second embodiment of the present invention.

FIG. 15 is a block diagram illustrating an arrangement of the DNS server 6.

The DNS server 6 is provided with a CPU 61, a memory 62, a network interface section 63, a broadcast wave receiving section 64, and an input/output section 65.

The CPU 61 realizes functional blocks later described. The memory 62 is provided with a RAM and a ROM. The memory 62 stores a program that the CPU 61 runs. The memory 62 also provides a work area for the program run on the CPU 61.

The network interface section 63 is constituted by a network interface card (NIS) or the like and is used for communication via the Internet.

The broadcast wave receiving section 64 is provided with an antenna for receiving the broadcast. Via the antenna, the broadcast wave receiving section 64 receives from the broadcast station 4 the IP address look-up information 10 that has been encoded. Then, the broadcast wave receiving section 64 decodes the IP address look-up information 10. If the IP address look-up information 10 is broadcast without being encoded, the broadcast wave receiving section 64 does not decode the received IP address look-up information 10.

The input/output section 25 is provided with a liquid crystal display screen and speaker, or the like unit for presenting an output (image and/or sound) from the portable telephone 2 to the user thereof. Moreover, the input/output section 25 is also provided with input keys for receiving an input from the user of the portable telephone 2, and a microphone or the like.

The CPU 61 runs the program stored in the memory 62 or the like, and control the respective sections according to needs. Thereby, the DNS server 6 according to the present embodiment can realize various functional blocks, and cause the respective member of the DNS server 6. The CPU 61 realizes the respective functional blocks by running a corresponding program stored in the memory 62 or the like and controlling necessary peripheral device.

Figure 16:
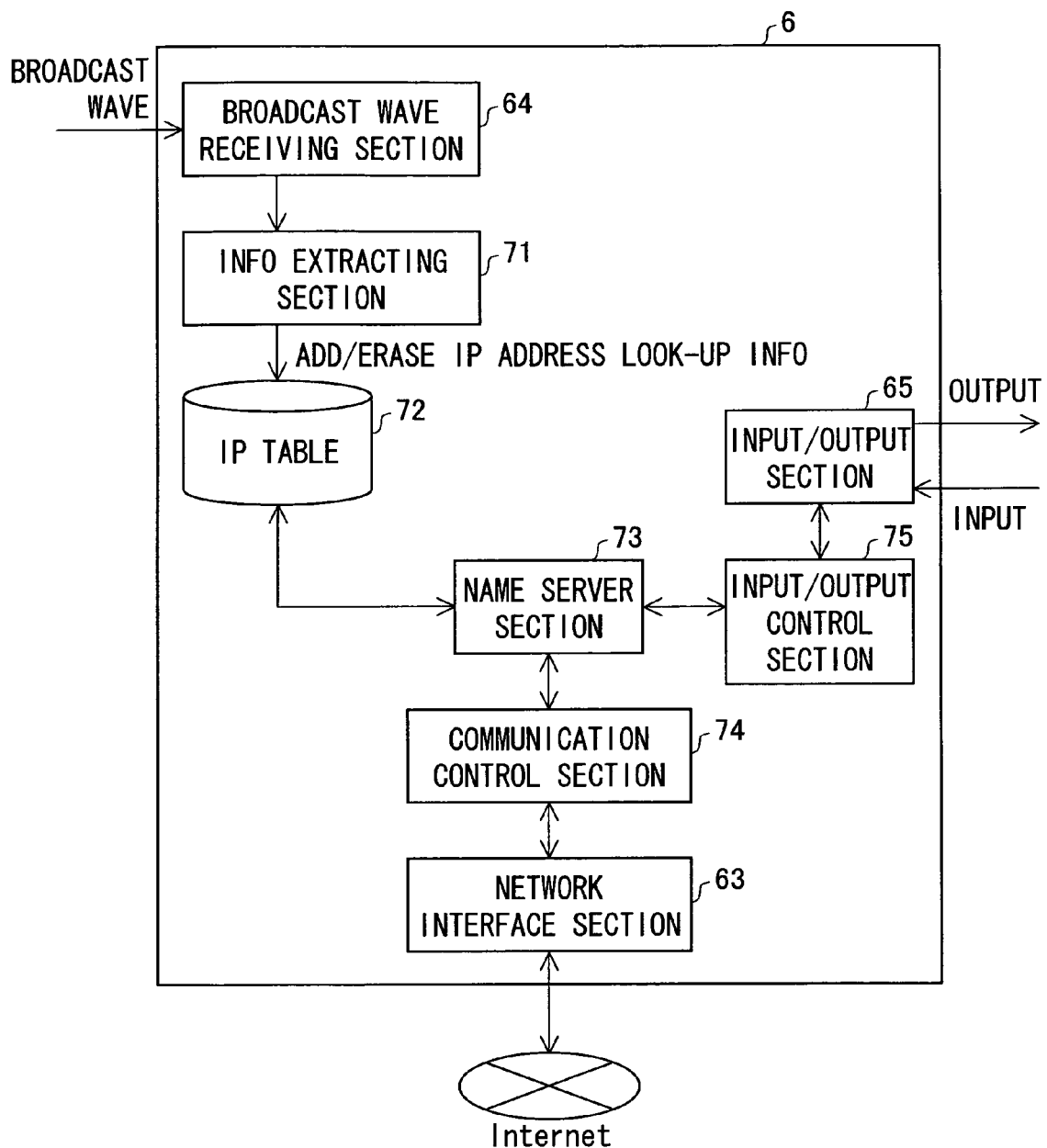
FIG. 16 is a functional block diagram of the DNS server 6 according to the second embodiment of the present invention.

FIG. 16 is a functional block diagram of the DNS server 6.

The DNS server 6 is provided with, as functional blocks, an information extracting section 71, the IP table 72, a name server section 73, a communication control section 74, and an input/output control section 75.

The information extracting section 71 interprets the IP address look-up information received by the broadcast wave receiving section 64. Then, the information extracting section 71 updates the IP table 72 according to an instruction described in the IP address look-up information 10. The instruction instructs to add or erase an association of an FQDN of a particular site and an IP address corresponding thereto. If the instruction instructs to add the association, then the association of the FQDN of a particular site and the IP address corresponding thereto is added to the IP table 72. If the instruction instructs to erase the association, then the association of the FQDN of a particular site and the IP address corresponding thereto is erased from the IP table 72.

The IP table 72 is used for answering the IP address in response to the name inquiry from the Web client 7 or another DNS server 3, which is a general DNS server. That is, the IP table 72 corresponds to a zone file or DNS cache. The IP table 72 describes association of the FQDN and the IP address corresponding to the FQDN.

The name server section 73 performs the name resolution in response to the name inquiry from the Web client 7 or the other DNS server 3. Ordinary name resolution is carried out by using a DNS cache, zone file and/or a upper-level DNS server 3. For the name resolution, the name server section 73 looks up the IP table 72. If the name resolution cannot be performed by reference to the IP table 72, the general process of DNS server is performed.

The communication control section 74 controls the communication between the name server section 73 and the Web client 7 via the network interface section 63. TCP/IP protocol stack or the like is implement on the communication control section 74.

The input/output control section 75 controls the input/output section 25. Moreover, the input/output control section 36 receives an input from the input/output section 65 and forwards the input to the name server 73. Further, the input/output control section 75 receives an output from the name server 73 and forwards the output to the input/output section 65.

<Procedure of Name Resolution Performed by DNS Server 6 in Normal State>

In the normal state, the DNS server 6 deals with the name inquiry from the Web client 7 or the other DNS server 3 in the same way as the general DNS server 3 deals with a name inquiry. Thus, the explanation on how the name inquiry is performed by the DNS server 6 in the normal state is omitted here.

<Procedure of Opening Mirror Site and Updating IP Table 72 when Earthquake Occurred>

Figure 17:
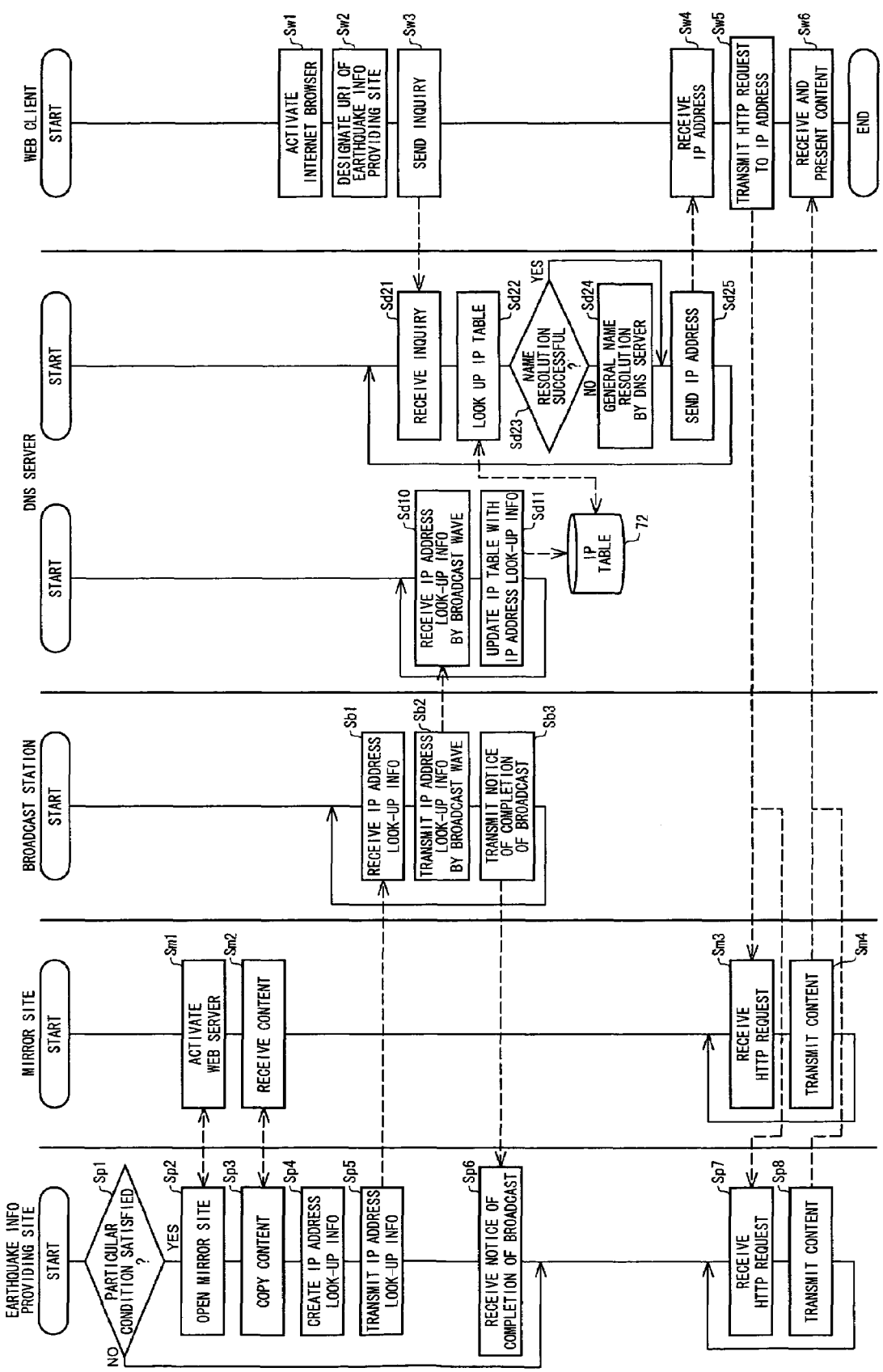
FIG. 17 is a flowchart illustrating procedures of opening mirror sites 5, updating an IP table 72, and accessing to one of the earthquake information providing site 1 and the mirror sites 5 by name resolution performed by the DNS server 6, after an earthquake occurred, in the second embodiment of the present invention.

Referring to the flowchart of FIG. 17, opening of the mirror sites 5 and updating the IP table 72 in the case of earthquake are described below in the order of the earthquake information providing site 1, the mirror sites 5, the broadcast station 4, and the DNS server 6. Part of the flowchart of FIG. 17 from the center portion to the left upper portion is referred to by the explanation below.

The procedure performed by the earthquake information providing site 1 is the same as in the first embodiment, and is not explained here repeatedly.

Except that the Web server section 16 receives the HTTP request from the Web client 7 not from the portable telephone 2 after Sm2, the procedure performed by the mirror sites 5 is the same as in the first embodiment, and is not explained here repeatedly.

The procedure performed by the broadcast station 4 is also the same as in the first embodiment, and is not explained here repeatedly.

The procedure performed by the DNS server 6 is as follows.

To begin with, the information extracting section 71 receives, via the broadcast wave receiving section 64, the IP address look-up information 10 broadcast from the broadcast station (Sd10). If the IP address look-up information 10 is encoded, the broadcast wave receiving section 64 decodes the IP address look-up information 10.

Then, the information extracting section 71 registers, on the IP table 72, the associations of the FQDN of the earthquake information providing site 1 and the IP addresses of the earthquake information providing site 1 and the mirror sites 5 (Sd11).

<Procedure of Name Resolution Performed by DNS Server 6 when Earthquake Occurred>

Referring to the flowchart of FIG. 17, the procedure of the name resolution performed by the DNS server 6 in the case of earthquake is described below. The explanation also explains the procedure of accessing from the Web client 7 to the earthquake information providing site 1. The Web client 7, the DNS server 6, the mirror site 5, and the earthquake information providing site 1 are described in this order. Part of the flowchart of FIG. 17 from lower portion to right portion is referred to by the explanation.

The procedure performed by the Web client 7 is as follows.

To begin with, the Web client 7 receives, from the user thereof, an instruction to activate an internet browser (not illustrated). Then, the Web client 7 activates the internet browser (Step w1, thereinafter, steps performed by the Web client 7 are referred to as Swx, such as Sw1).

After that, the internet browser receives, from the user of the Web client 7, an instruction to access to the earthquake information providing site (Sw2). At Sw2, the FQDN of the earthquake information providing site 1 (www.earthquake-infor.com) is inputted or selected.

Then, the internet browser transmits, to the DNS server 6, the inquiry for the name resolution for finding the IP address from the FQDN of the earthquake information providing site 1 (Sw3).

After that, the internet browser receives, from the DNS server 6, the IP address that is the result of the name resolution (Sw4). The received IP address is one of 192.168.0.1, 192.168.0.2, 192.168.0.3, and 192.168.0.4.

Next, the internet browser transmits the HTTP request to that one of the mirror sites 5 and the earthquake information providing site 1 which has the IP address obtained in response to the inquiry for the name resolution (Sw5).

Then, the internet browser receives the content from the earthquake information providing site 1, and presents the received content to the user of the Web client 7 (Sw6).

The procedure performed by the DNS server 6 is as follows:

To begin with, the name server section 73 receives the inquiry for the name resolution from the Web client 7 via the communication control section 74 and the network interface section 63 (Sd21).

After that, the name server section 73 performs the name resolution of the FQDN of the earthquake information providing site 1 by reference to the IP table 72 (Sd22). How the name resolution is performed by the name server section 73 by reference to the IP table 72 will be described later.

Then, the name server section 73 determines whether the name resolution by reference to the IP table 72 is successful or not (Sd23).

If the name resolution is successful, the procedure goes to Sd25. If the updating of the IP table 72 in response to the occurrence of earthquake had been already completed, the associations of the FQDN of the earthquake information providing site 1 and the IP addresses to the earthquake information providing site 1 and the mirror sites 5 would be already registered on the IP table 72. Thus, the name resolution by reference to the IP table 72 would be done successfully.

If the name resolution is failed, the procedure goes to Sd24. If the DNS server 6 did not receives the IP address look-up information 10 broadcast from the broadcast station 4 after the earthquake occurred, and consequently the updating of the IP table 72 was not updated, the associations of the FQDN of the earthquake information providing site 1 and the IP addresses to the earthquake information providing site 1 and the mirror sites 5 would not be registered on the IP table 72. Thus, Thus, the name resolution by reference to the IP table 72 would be done unsuccessfully.

If the name resolution is failed, the name server section 73 performs the name resolution of the FQDN (www.earthquake-infor.com) by searching across the DNS cache and recursive inquiry, which are general operation performed by DNS servers (Sd24). The name resolution at Sd24 gives IP address (192.168.0.1) of the earthquake information providing site 1.

Then, the IP address (One of 192.168.0.1, 192.168.0.2, 192.168.0.3, and 192.168.0.4) obtained by the name resolution is sent back to the Web client 7 via the communication control section 74 and the network interface section 63 from the name server section 73 (Ss25).

Except that the Web server section 16 receives the HTTP request from the Web client 7 but not from the internet browser 34 of the portable telephone 2, the procedure performed by the earthquake information providing site 1 and the procedure performed by the mirror site 5 are identical with those in the first embodiment. Thus, their explanation is omitted here.

<Name Resolution Performed by Name Server Section 73>

Figure 18:
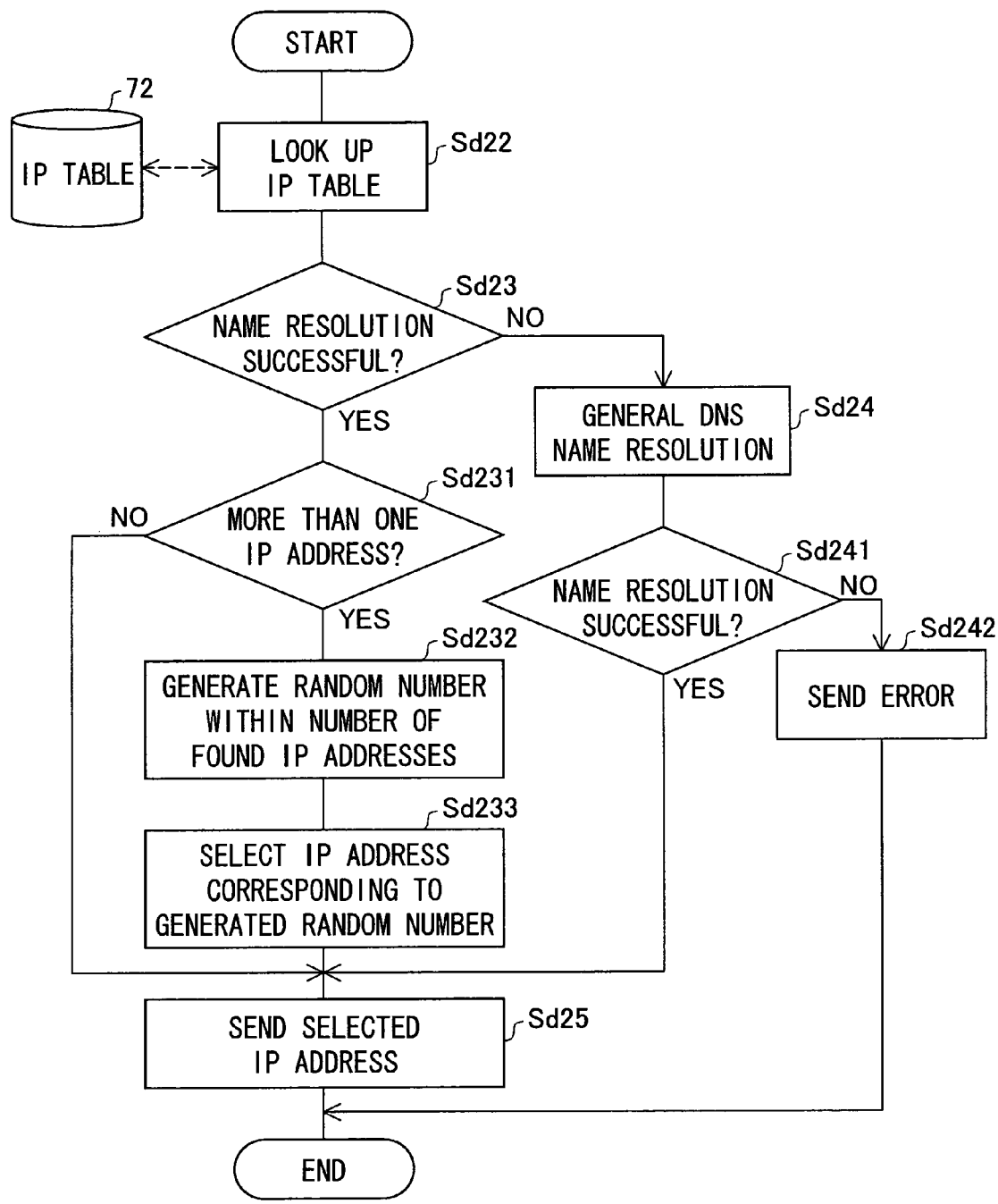
FIG. 18 is a flowchart illustrating a procedure of randomly selecting one IP address from IP addresses by the name resolution performed by the DNS server 6 according to the second embodiment of the present invention.

Referring to the flowchart of FIG. 18, the name resolution performed by the name server section 73 is described below.

To begin with, the name server section 73 looks up the IP table 72 so as to try the name resolution with the FQDN (www.earthquake-infor.com), which is inquired by the internet browser of the Web client 7, of the earthquake information providing site 1 (Sd22). Then, the name server section 73 determines whether the name resolution by reference to the IP table 72 is successful or not (Sd23).

If the name resolution is successful, the procedure goes to Sd231. The name resolution would be successful, if the updating of the IP table 72 in response to the occurrence of earthquake had been completed, and the associations of the FQDN of the earthquake information providing site 1 and the IP address of the earthquake information providing site 1 and the IP addresses of the mirror sites 5 (associations of www.earthquake-infor.com and 192.168.0.1, www.earthquake-infor.com and 192.168.0.2, www.earthquake-infor.com and 192.168.0.3, and, www.earthquake-infor.com and 192.168.0.4) were registered on the IP table 72.

If the name resolution is failed, then the procedure goes to Sd24. The name resolution would be failed if no association of the FQDN of the earthquake information providing site 1 and the IP address is registered on the IP table 72.

If the name resolution is successful, the name server section 73 determines whether or not more than one association of the earthquake information providing site 1 and the IP address is registered on the IP table 72 (Sd231).

If more than one association is registered, the procedure goes to Sd232.

If not, the procedure goes to Sd25.

If more than one association is registered, the name server section 73 generates a random number within a range of from 1 to a number of the associations (Sd232).

Then, the name server section 73 selects one of the IP addresses, which corresponds to the generated random number (Sd233). The name server section 73 sends the selected IP address to the internet browser of the Web client 7. Then, the procedure is completed.

If the name resolution is failed at Sd23, the name server section 73 performs the generally-performed name resolution (Sd24).

Next, the name server section 73 determines whether the generally-performed name resolution is successful or not (Sd241).

If the ordinary name resolution is successful, the procedure goes to Sd25. The ordinary name resolution would be successful, if the DNS record regarding the association of the FQDN of the earthquake information providing site 1 and the IP address(es) is registered in the DNS server 6 or the higher-level DNS server.

If the ordinary name resolution is failed, the procedure goes to Sd242. The name server section 73 sends an error message to the Web client 7, the error message notifying that the name resolution is unsuccessful. Then, the procedure is terminated.

If it is determined at Sd231 that there is only one association is present, the IP address of the association is sent from the name server section 73 to the internet browser of the Web client 7, and Sd25 is performed.

If it is determined at Sd241 that the name resolution is successful, the name server section 73 sends to the Internet browser of the Web client 7 the IP address (192.168.0.1) that corresponds to the earthquake information providing site 1 and acquired by the ordinary name resolution. Then, Sd25 is performed.

<Procedure of Closing Mirror Sites 5 and Updating IP Table 72 when Restoring Normal State>

Referring to a flowchart of FIG. 19, the procedure of closing the mirror sites 5 and updating IP table 72 when a sufficient time period elapsed since the occurrence of the earthquake and the particular condition is no more satisfied, that is, when the normal state is restored.

The procedure performed by the earthquake information providing site 1, the procedure performed by the broadcast station 4, and the procedure performed by the mirror sites 5 are the same as those in the first embodiment. Thus, their explanation is omitted here.

The procedure performed by the DNS server 6 is as follows.

Firstly, the information extracting section 71 receives the IP address look-up information 10 broadcast from the broadcast station 4 (Sd30). If the IP address look-up information is encoded, the broadcast wave receiving section 64 decodes the IP address look-up information 10.

Then, the information extracting section 71 erases, from the IP table 72, the association of the FQDN of the earthquake information providing site 1 and the IP addresses of the earthquake information providing site 1 and the mirror sites 5 according to the received IP address look-up information 10, which indicate the association(s) to be erased.

Third Embodiment

In a technique according to the present invention for updating (rewriting) an IP table by using a broadcast wave, a portable telephone 2 and a DNS server 6 are used, and one extra layer is provided as name resolution performed by using DNS. This allows this technique to be employed in various applications in addition to the load distribution for distributing a large number of accesses by randomly selecting the IP addresses.

<Outline>

One of such applications is dynamic URI. One specific example of the dynamic URI is a TV program-coupled service. In this application example, different information is provided according to a broadcast schedule of a TV program (TV content) by dynamically changing an IP address for a URI according to the broadcast schedule.

Referring to FIG. 20, an outline of the present embodiment is described below.

For example, suppose URI of a program information providing site (data setting information generating site) is http://www.tv-information.co.jp. During a period in which a correspondence shopping program (such as TV shopping program, radio shopping program, etc.) is on air, a broadcast station 4 broadcasts IP address look-up information 10 that indicates that an IP address in association with the URI is an IP address (192.168.0.20) of a site of the correspondence shopping program (program-relating site), as illustrated in FIG. 20(*a*). Therefore, if a user of the portable telephone 2 of the present invention accessed to the URI (http://www.tv-information.co.jp) of the program information providing site 8 at this moment, the site of the correspondence shopping program is displayed.

When a news program is on air after the completion of the correspondence shopping program, the broadcast station 4 broadcasts, during the broadcasting of the news program, IP address look-up information 10 that indicates that an IP address in association with the URI is an IP address (192.168.0.40) of a site of the news program (program-relating site), as illustrated in FIG. 20(*b*). Therefore, if the user of the portable telephone 2 of the present invention accessed to the URI (http://www.tv-information.co.jp) of the program information providing site 8 at this moment, the site of the news program is displayed.

This arrangement allows the user of the portable telephone 2 of the present invention to obtain information relating to the TV program currently on air from the corresponding site on the Internet simply by accessing to the same URI of the broadcast information providing site 8.

This technique may be arranged such that the IP address in association with the one URI is changed in plural times during the broadcast of one program, and IP address look-up information 10 indicating the IP address is broadcast every time the IP address in association with the URI is changed. With this arrangement, for example, an economic news program in which a plurality of corporations are introduced may be broadcast in such a manner that the IP address in association with the URI of the program information providing site 8 is changed to be an IP address of the corporation that is currently being introduced, and the IP address look-up information 10, which is so generated as to indicate the IP address of the corporation, is broadcast.

In other words, it is the particular event in the present embodiment to change, while the broadcast program is being broadcast, the information providing site of the broadcast program according to the contents of the broadcast program. The program information providing site 8 generate the IP address look-up information 10 every time the particular event occurs.

Further, the present embodiment may be arranged such that contents of the site of the IP address indicated in the IP address look-up information 10 is automatically displayed on a TV screen upon receiving the IP address look-up information 10. That is, the contents of the site of the IP address may be displayed, just like telops on TV broadcasting, such as earthquake flash report, typhoon warning, etc.

Moreover, this technique is applicable to radio broadcast. For example, the contents of the broadcast information providing site 8 relating to a radio program being broadcast may be displayed on a screen of the portable telephone 2 during the radio broadcast.

<Arrangements of Program Information Providing Site 8, Broadcast Station 4, and Portable Telephone 2>

The arrangements of the program information providing site 8, broadcast station 4, and portable telephone 2 are similar to the earthquake information providing site 1, broadcast station 4, and portable telephone 2. Thus, their explanation is omitted here.

<Procedure of Updating IP Table 32>

A procedure of updating an IP table 32 in the present embodiment is similar to the procedure of updating the IP table 32 in the first embodiment. Thus, their explanation is omitted here.

Fourth Embodiment

<Outline>

Another example of the applications of the present invention is a URI for providing different pieces of information depending on current location of a portable telephone 2. One specific example is a local information providing service. In this application example, different pieces of information are provided according to the current location of the portable telephone 2 by selecting an IP address that corresponds to an area where a portable telephone 2 is currently located, from among a plurality of IP addresses that are provided for different areas respectively.

Figure 21:
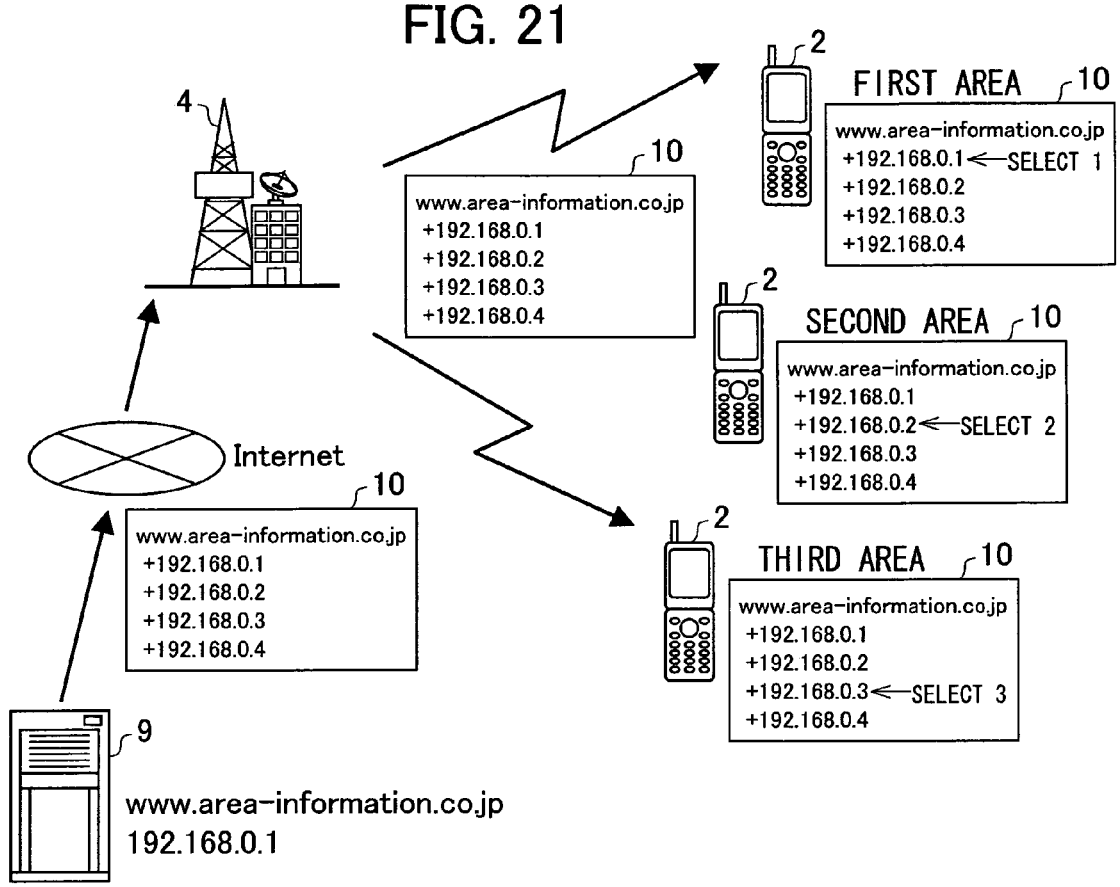
FIG. 21 is a view illustrating a fourth embodiment of the present invention.

An outline of the present embodiment is described below referring to FIG. 21.

A local information providing master site (data setting information generating site) 9 (URI: http://www.area-information.co.jp) sends, to a broadcast station 4, IP address look-up information 10 that shows associations of local numbers n (n=natural number) and nth local information providing sites (not illustrated). The local numbers are numerical references of areas. The nth local information providing sites are sites for providing information that corresponds to the area of the corresponding local number. The IP address look-up information 10 provided by the local information providing master site 9 is transmitted from the broadcast station 4 to the portable telephone 2 by a broadcast wave. The portable telephone 2 receives the broadcast wave and updates an IP table 32b with the contents of the IP address look-up information 10. When a user of the portable telephone 2 accesses to the local information providing master site 9 (http://www.area-information.co.jp), the portable telephone 2 finds out the current location of the portable telephone 2 according to GPS signals from GPS satellites (not illustrated), so as to determine in which area the current location is included. For example, consider an IP address 192.168.0.n. If it was determined that the current location is in a second area (n=2), "n" in the IP address 192.168.0.n would be "2". Thus, an IP address 192.168.0.2 on the IP table 32b would be selected, and the portable telephone 2 would be caused to access to a second area information providing site in association with the IP address 192.168.0.2. Alternatively, the present embodiment may be arranged such that "n" indicates an order of the IP addresses on the IP table 32b. For example, an IP address listed in second on the IP table 32b would be considered as being in association with the second area. The listed in second on the IP table 32b is 192.168.0.2, here. So, if n=2, the portable telephone 2 would be caused to access to the second area information providing site that is in association with the IP address 192.168.0.2.

<Arrangement of Local Information Providing Master Site 9>

A block diagram of the local information providing master site 9 is similar to the block diagram of FIG. 3 that is the block diagram of the earthquake information providing site 1 in the first embodiment. Thus, explanation on the structure of the local information providing master site 9 is omitted here.

Figure 22:
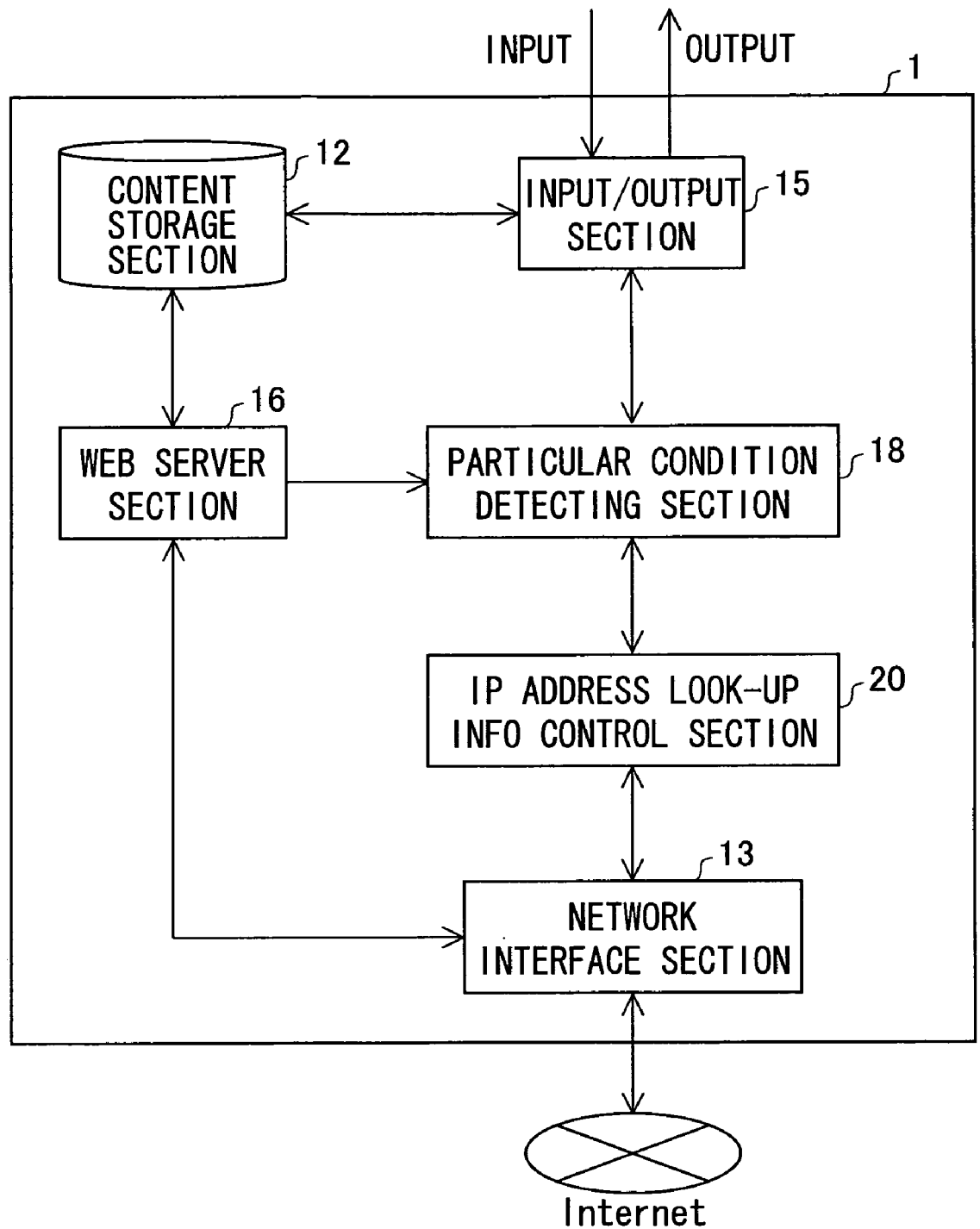
FIG. 22 is a functional block diagram of the local information providing mater site 9 according to the fourth embodiment of the present invention.

FIG. 22 is a block diagram illustrating a functional block diagram of the local information providing master site 9. The functional block diagram of FIG. 22 is different from the functional block diagram of FIG. 4 of the first embodiment in that a particular condition detecting section 18 and an IP address look-up information control section 20 are provided out of the redundancy control section 17. When a nth area information providing site is newly opened or closed, or when an IP address to be in association with the nth area information providing site is changed, the particular condition detecting section 18 detects that a particular condition is satisfied. Then, the particular condition detecting section 18 instructs the IP address look-up information control section 20 to generate IP address look-up information 10. Apart from that, the arrangement of the present embodiment is similar to the arrangement of the earthquake information providing site 1 in the first embodiment, and is not explained here repeatedly.

The local information master site 9 may be arranged such that the local information master site 9 generates the IP address look-up information 10 and sends it to the broadcast station 4, but does not provide the local information. In this case, a Web server section 16 is not necessary.

<Arrangement of Portable Telephone 2>

Figure 23:
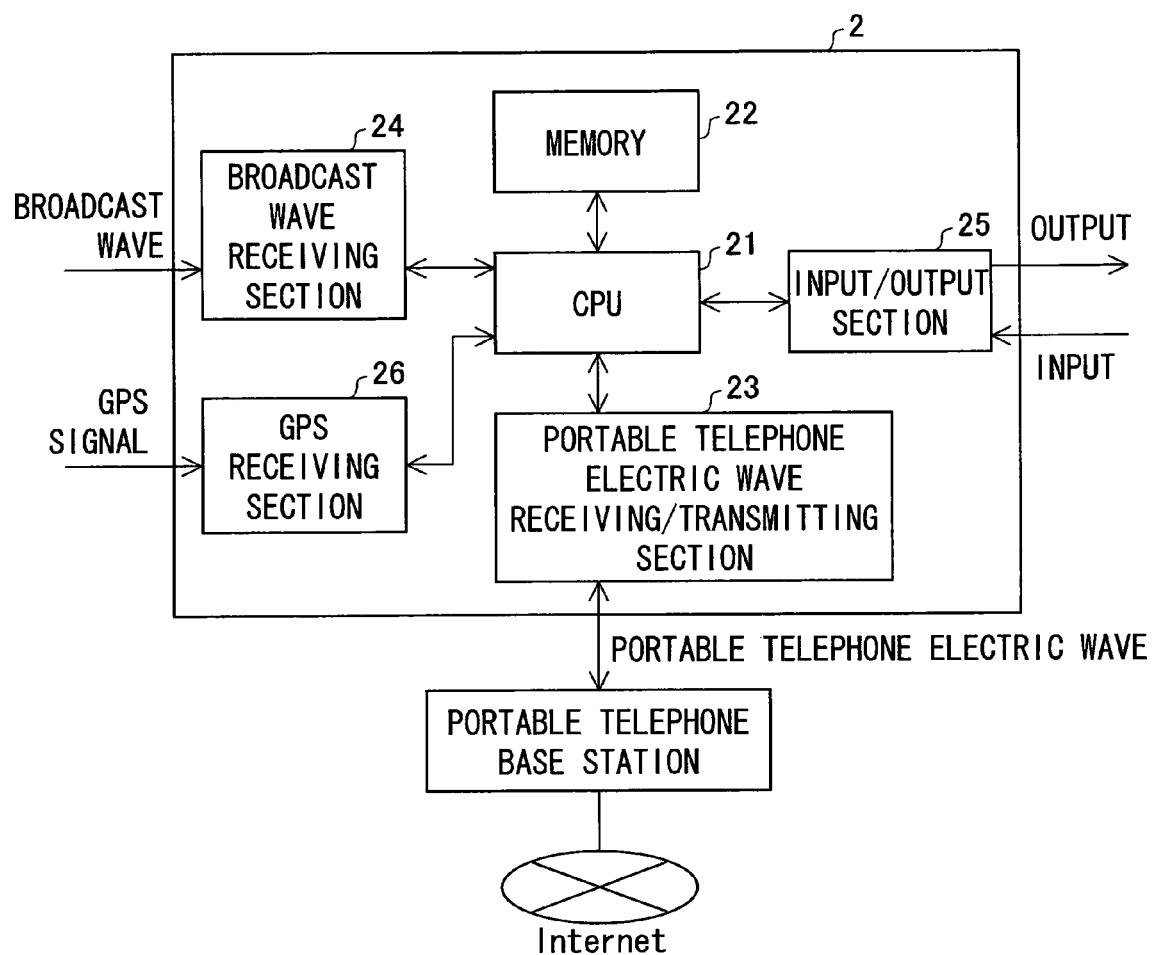
FIG. 23 is a block diagram of the portable telephone 2 according to the fourth embodiment of the present invention.

FIG. 23 is a block diagram of the portable telephone 2 according to the present embodiment. The portable telephone 2 has an arrangement similar to the portable telephone 2 of the first embodiment illustrated in FIG. 7, except that a GPS receiving section (current location acquiring means) 26 is provided in the present embodiment. Thus, explanation except for the GPS receiving section 26 is omitted here.

The GPS receiving section 26 receives the GPS signals from the GPS satellites, and notifies a CPU 21 of the current location.

Figure 24:
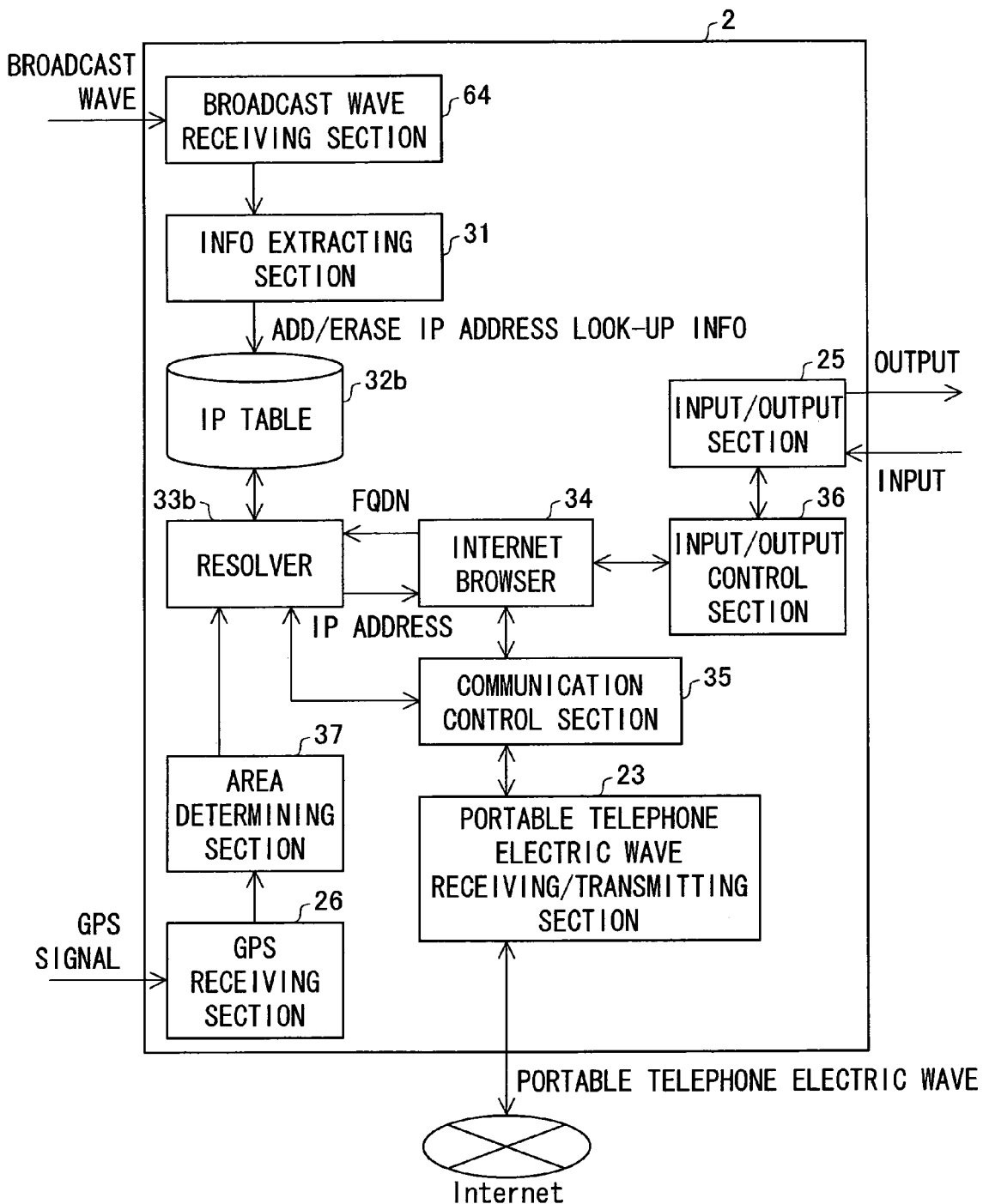
FIG. 24 is a functional block diagram of the portable telephone 2 according to the fourth embodiment of the present invention.

FIG. 24 is a functional block diagram of the portable telephone 2 according to the present embodiment. This functional block diagram is similar to the functional block diagram of the portable telephone 2 illustrated in FIG. 8, except that the GPS receiving section 26 and an area determining section 37 are added in the present embodiment. Thus, explanation except for the GPS receiving section 26 and the area determining section 37 is omitted here.

The area determining section 37 receives, from the GPS receiving section 26, information on the current location of the portable telephone 2. Based on this information, the area determining section 37 determines in which area the current location of the portable telephone 2 is included. The area determining section 37 notifies a resolver 33b of a result of its determination.

Normally, the resolver 33b performs name resolution by making a name inquiry to a DNS server 3 (which is a general DNS server). However, if the user of the portable telephone 2 inputs or designates the URI (http://www.area-information.co.jp) of the local information providing master site 9, an IP address of a local area providing site that provides the local information suitable for the nth area is selected by the resolver 33b from the IP table 32b based on the result of the determination that the current location of the portable telephone 2 is included in the nth area.

<Procedure of Updating IP Table 32b>

Figure 25:
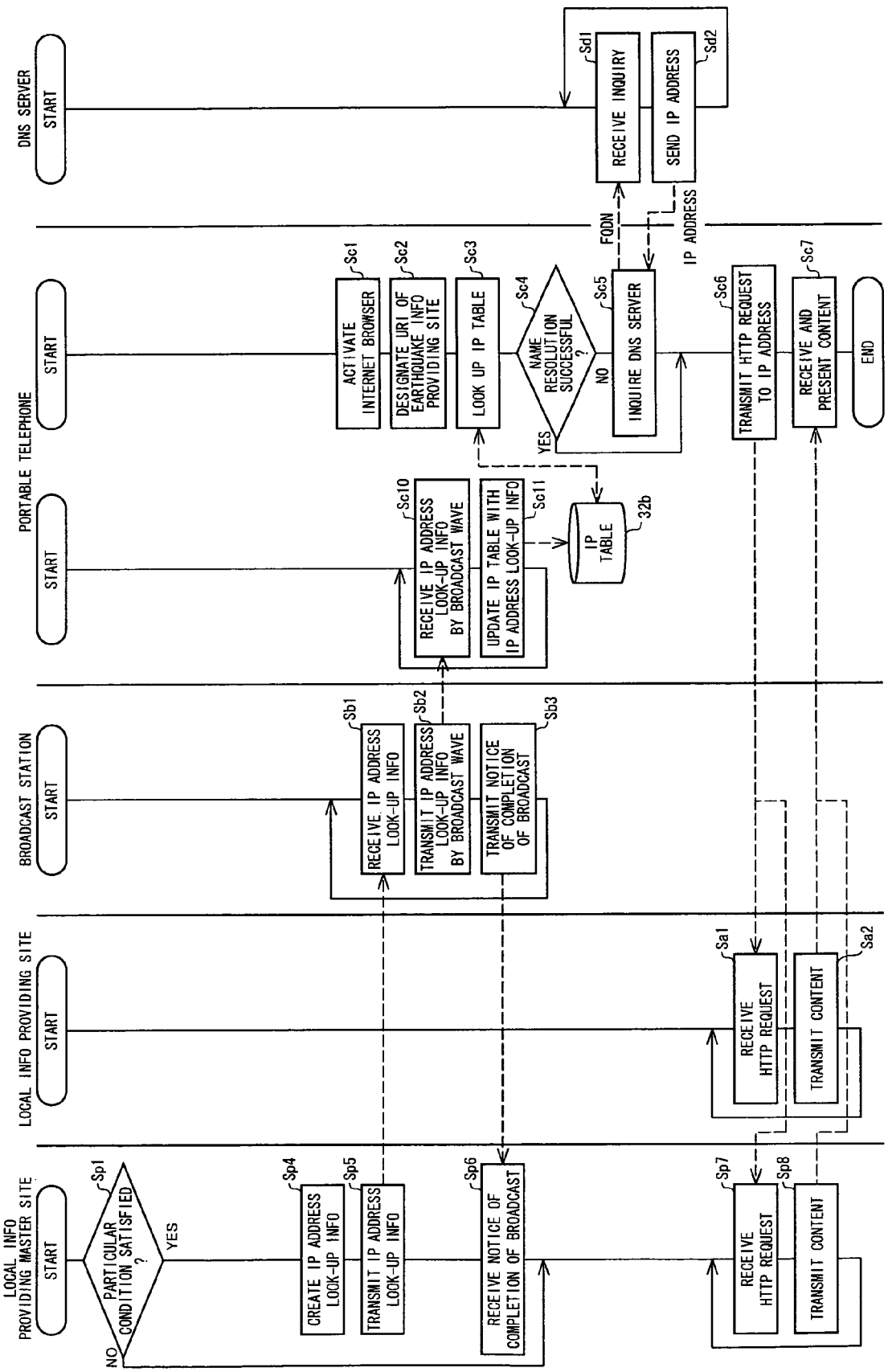
FIG. 25 is a flowchart illustrating procedures of updating an IP table 32, and accessing from the portable telephone 2 to the local information providing master site 9 or the area information providing site in the fourth embodiment of the present invention.

The procedure of updating the IP table 32b is illustrated in a flowchart of FIG. 25. The procedure of the IP table 32b is similar to the procedure of updating the IP table 32 in the first embodiment. So, only difference of the procedure of updating the IP table 32b from the procedure of updating the IP table 32 is explained below.

The flowchart of the fourth embodiment illustrated FIG. 25 is different from that of the first embodiment illustrated in FIG. 10 as follows: In the first embodiment, the mirror site 5 is opened as instructed by the earthquake information providing site 1 after the particular condition is satisfied. However, in the fourth embodiment, the process of opening the area information providing site is not performed when the particular condition is satisfied. That is, the local information providing site has been already opened in the fourth embodiment, so that the local information providing site is capable of receiving an HTTP request from the portable telephone 2 any time. In this point, the flowcharts of FIG. 10 and FIG. 24 are largely different.

<Procedure of Accessing to Local Information Providing Site from Portable Telephone 2>

An outline of the procedure of accessing to the local information providing site from the portable telephone 2 is illustrated in the flowchart of FIG. 25. Except when the portable telephone 2 accesses to the local information providing site registered on the IP table 32b, the accessing is carried out by the name resolution performed by making the name inquiry to the DNS server 3, as described in the explanation on the resolver 33b. How to select the IP address of the local information providing site registered on the IP table 32b will be described later. Apart from that, the procedure of accessing is similar to that in the first embodiment, and is not explained here repeatedly.

<Name Resolution by Resolver 33b>

Figure 26:
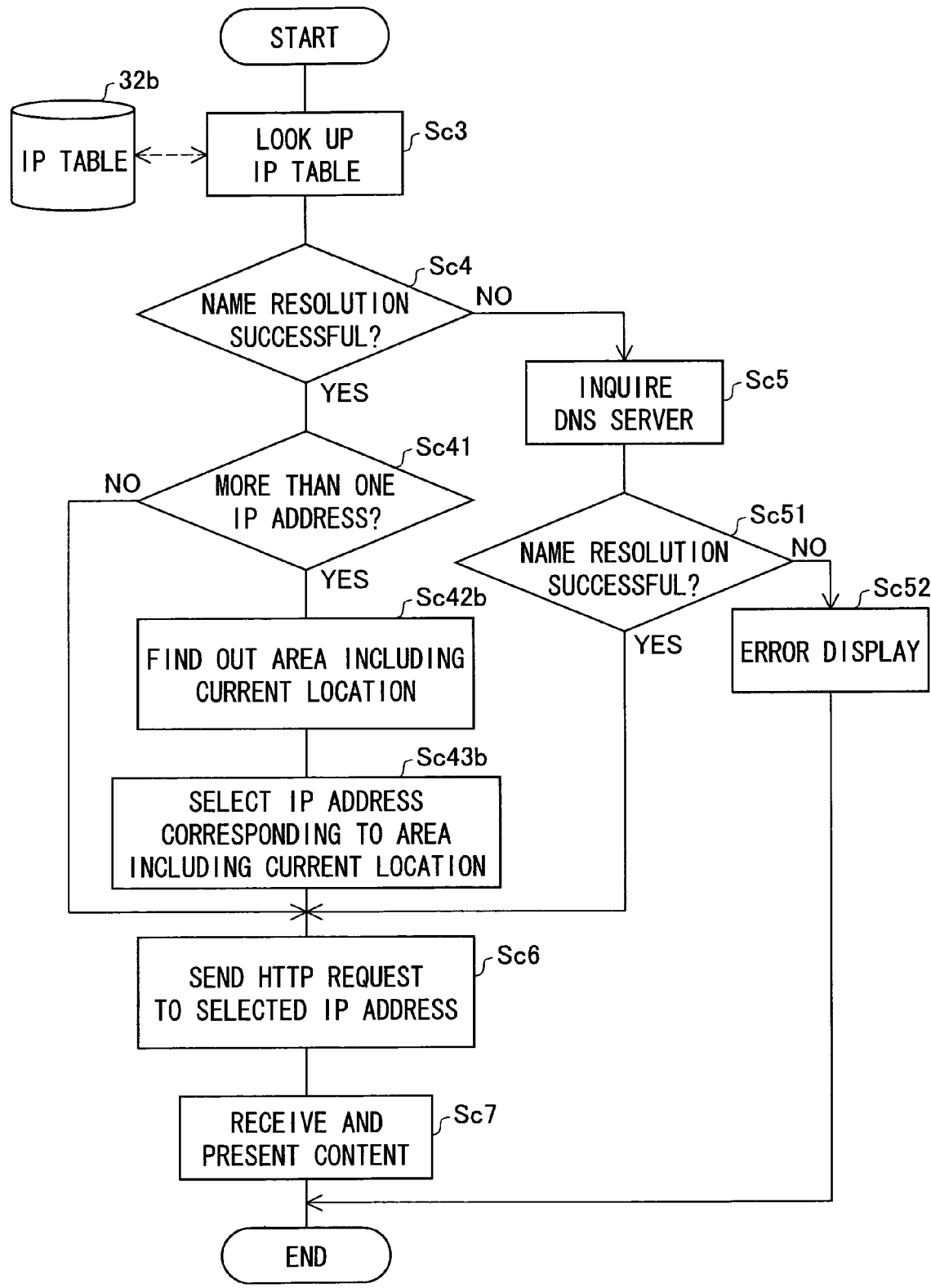
FIG. 26 is a flowchart illustrating procedures of performing name resolution of a resolver 33 of the portable telephone 2 and randomly selecting, from among a plurality of IP addresses, of one IP address of a local information providing site that corresponds an area in which a current location of the portable telephone 2.

FIG. 26 is a flowchart illustrating details of a process of name resolution performed by the resolver 33b in the present embodiment. Except steps Sc42b and Sc43b, the process of the name resolution is similar to the name resolution performed by the resolver 33 in the first embodiment, and is not explained here repeatedly.

The step Sc42b is performed in case where the FQDN of the local information providing master site 9 and plural IP addresses in association therewith are registered on the IP table 32b. The resolver 33b acquires, from the area determining section 37, the result of the determination on the area the portable telephone 2 is currently located (Sc42b).

Then, by reference to the IP table 32b, the resolver 33b selects one IP address in association with the area in which the current location of the portable telephone 2 (Sc43b). As described above, the association between the nth area and the IP address may be such that the nth area and the fourth octet (192.168.0.n) of the IP address (Ipv4) are associated with each other, or may be such that the nth area and the nth IP address among the IP addresses in association with the FQDN of the local information providing master site 9 on the IP table 32b are associated with each other.

Other Application Examples of Updating IP Table by Using Broadcast Wave

At this moment, it is impossible to use a short URI such as http://a.com, and an URI lacking a domain designation, such as http://a. However, according to the technique according to the present invention for updating the IP table by using a broadcast wave, the user can access, by inputting a short URI such as http://eq, to the earthquake information providing site having a long URI (http://earthquake-infor.com), if the short URI (http://eq) is in association with the earthquake information providing site 1. This is especially convenient when accessing to such a site at emergency. Thus, the user does not need to input the long URI by using ten keys of the portable telephone 2 in order to access to the site from the portable telephone 2.

The present invention is not limited to the description of the embodiments above, but may be altered by a skilled person within the scope of the claims. An embodiment based on a proper combination of technical means disclosed in different embodiments is encompassed in the technical scope of the present invention.

Finally, the respective blocks of the portable telephone 2, especially, the information extracting section 31, resolver 33, internet browser 34, communication control section 35, and input/output control section 36 of the portable telephone 2, and the respective blocks of the DNS server 6, especially, the information extracting section 71, name server section 73, communication control section 74, and input/output section 75 of the DNS server 6 may be constituted by a hardware logic or by software using a CPU as described below.

The portable telephone 2 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The object of the present invention can also be achieved by mounting to the portable telephone 2 a computer-readable storage medium containing control program code (executable program, intermediate code program, or source program) for the portable telephone 2, which is software realizing the aforementioned functions, in order for the computer (or CPU, MPU) to retrieve and execute the program code contained in the storage medium.

The storage medium may be, for example, a tape, such as a magnetic tape or a cassette tape; a magnetic disk, such as a Floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The portable telephone 2 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth, 802.11 wireless, HDR, mobile telephone network, satellite line, or terrestrial digital network. The present invention encompasses a carrier wave or data signal transmission in which the program code is embodied electronically.

(1) An information terminal according to the present invention includes: a broadcast wave receiving section for receiving a broadcast wave; a name resolution section for performing name resolution in order to find, from a site name, an address to access; and a browsing section for browsing to the address found by the name resolution means. In order to attain the object, the information terminal according to the present invention is provided with: a storage section for storing look-up data that indicates association of the site name and the address that corresponds to the site name; and an information extracting section for extracting, from the broadcast wave received by the broadcast wave receiving means, data setting information with which the look-up data is to be updated so as to update the site name and the address corresponding thereto stored in the storage section or to add a site name and an address corresponding thereto in the storage section. In this arrangement, by the site registered in the look-up data, the browsing means browsing to the address being found by the name resolution means performing the name resolution by searching, across the storage section, for the address that corresponds to the site name.

Furthermore, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution means. In order to attain the object, the method according to the present includes: extracting, from the broadcast wave received by the broadcast wave receiving means, data setting information with which the look-up data is to be updated so as to update the site name and the address corresponding thereto stored in a storage section or to add a site name and an address corresponding thereto in the storage section; and the name resolution means performing the name resolution by searching, across the look-up data, for the address that corresponds to the site name, the browsing means browsing to the address by the site registered in the look-up data.

In this arrangement, the address to access, which is described in the look-up address of the information terminal is updated in synchronism with the broadcast content currently on the air. With this, different addresses of program content relating site that relates to contents of the broadcast content can be sent according to the broadcast content. For example, during broadcasting of a correspondence shopping program, the program content relating site registers, on the look-up data for the information terminal, an address of the correspondence shopping program via the broadcast wave. This registered address is regarded as the address to access when browsing to the program content relating site during broadcasting of the correspondence shopping program. On the other hand, during broadcasting of a news program, the program content relating site registers, on the look-up data for the information terminal, an address of the news program via the broadcast wave. This registered address is regarded as the address to access when browsing to the program content relating site during broadcasting of the news program.

For example, in case of using the Internet, the site name and the address to access are respectively FQDN (Fully Qualified Domain Name) and IP (Internet Protocol) address.

In this arrangement, the data setting information provided from the program content relating site is broadcasted via the broadcast wave. With this, it is possible to switch, according to the data setting information, the contents to be displayed on the program content relating site when the information terminal browse thereto. Thus, the user of the information terminal can browse various contents relating to the various program relating site simply by inputting or designating the URI of the program content relating site. That is, it is possible to eliminate the need of manually inputting various URIs to browse various sites.

(2) An information terminal according to the present invention includes: a broadcast wave receiving section for receiving a broadcast wave; a name resolution section for performing name resolution in order to find, from a site name, an address to access; a browsing section for browsing to the address found by the name resolution means; and a current location acquiring section for acquiring a current location of the information terminal. In order to attain the object, the information terminal according to the present invention is provided with: a storage section for storing look-up data that indicates an association of a common site name and a plurality of addresses of sites that are provided for different areas respectively; an information extracting section for extracting, from the broadcast wave received by the broadcast wave receiving means, data setting information with which the look-up data is to be updated so as to update the common site name and the address(es) corresponding thereto stored in the storage section or to add a site name and an address(es) corresponding thereto in the storage section. In this arrangement, by the common site name the browsing means browsing to an address selected by the name resolution means performing the name resolution by searching, across the look-up data, for the addresses associated with the common site name, and selecting, from among the addresses, an address corresponding to an area in which the current location acquired by the current location acquired means is included.

Moreover, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution means. In order to attain the object, the method according to the present invention includes: extracting, from the broadcast wave received by the broadcast wave receiving means, data setting information with which the look-up data is to be updated so as to update the site name and the address corresponding thereto stored in a storage section or to add a site name and an address corresponding thereto in the storage section; and the name resolution means performing the name resolution by searching, across the look-up data, for the address that corresponds to the site name, the browsing means browsing to the address by the site registered in the look-up data.

In this arrangement, when a user of the information terminal is to browse to a local information providing site, the browsing section browses to the address of the local information providing site that is acquired from the look-up data by the name resolution section according to the current location of the information terminal. The local information providing site of the acquired address is a site that provides local information of an area in which the current location of the information terminal is included. As a result of the browsing section browsing to the local information providing site that provides the local information regarding the area in which the information terminal is currently located, the content of the local information providing site switched according to the current location of the information terminal is presented (e.g., displayed).

For example, if the information terminal is located in a first area, an address of a local information providing site (site provided for a local area) that provides information regarding the first area is sent to the browsing section by the name resolution section as the address to access as the local information providing site. (The address is described in the look-up data.) If the information terminal is located in a second area, an address of a local information providing site that provides information regarding the second area is sent to the browsing section by the name resolution section as the address to access as the local information providing site. (The address is described in the look-up data.)

With this arrangement, it is possible to access to a local information providing site suitable for the current location of the information terminal by reference to the look-up data which indicates associations of a common site name of the local information providing sites, areas, and addresses of the local information providing sites that provide information on the respective areas. The look-up data is updated with data setting information transmitted via the broadcast wave. Thus, it is possible to browse the contents of the local information providing site suitable for the current location of the information terminal simply by inputting or designating the common site name of the local information providing sites. That is, it is possible to eliminate the need of manually inputting various URIs to browse various sites.

(3) An information terminal according to the present invention includes: a broadcast wave receiving section for receiving a broadcast wave; a name resolution section for performing name resolution in order to find, from a site name, an address to access; and a browsing section for browsing to the address found by the name resolution means. In order to attain the object, the information terminal is provided with: a storage section for storing look-up data that indicates an association of the site name and a plurality of addresses that are in association with the site name, the plurality of addresses including the address; an information extracting section for extracting, from the broadcast wave received by the broadcast wave receiving means, data setting information with which the look-up data is to be updated so as to update the common site name and the address(es) corresponding thereto stored in the storage section or to add a site name and an address(es) corresponding thereto in the storage section; and an address selecting section for randomly selecting an address from among the plurality of addresses stored in the storage section. In this arrangement, by the site registered in the look-up data, the browsing means browsing to the address randomly selected by the address selecting means from among the plurality of addresses that correspond to the site name and are found by the name resolution means performing the name resolution by searching across the look-up data.

Furthermore, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution means. In order to attain the object, the method according to the present invention includes: extracting, from the broadcast wave received by the broadcast wave receiving means, data setting information with which the look-up data is to be updated so as to update the common site name and the address(es) corresponding thereto stored in a storage section or to add a site name and an address(es) corresponding thereto in the storage section; the name resolution means performing the name resolution by searching, across the look-up data, for the plurality of addresses that correspond to the site name; and randomly selecting an address from among the plurality of addresses found by the name resolution means, the browsing means browsing to the selected address by the site registered in the look-up address.

In this arrangement, the address to access, which is described in the look-up address of the information terminal is updated in synchronism with the broadcast content currently on the air. For example, during the broadcast of a correspondence shopping program, the program content relating site registers, on the look-up data for the information terminal, the addresses of the correspondence shopping site and its mirror site via the broadcast wave. These registered addresses are regarded as the addresses that correspond to the site name of the program content relating site when browsing to the program content relating site during the broadcast of the correspondence shopping program. During the broadcast of a news program, the program content relating site registers, on the look-up data for the information terminal, the addresses of the news program site and its mirror site via the broadcast wave. These registered addresses are regarded as the addresses that correspond to the site name of the program content relating site when browsing to the program content relating site during the broadcast of the news programs.

In this arrangement, the data setting information provided from the program content relating site is transmitted via the broadcast wave. By reference to the data setting information, it is possible to switch the contents to be displayed by browsing to the program content relating site by using the browser of the information terminal. Thus, the contents of various program content relating sites that relates to the contents of the program can be browsed simply by inputting or designating the URI of the program content relating site. That is, it is possible to eliminate the need of manually inputting various URIs. As another effect of this arrangement, it is possible to randomly select one of the program content relating site and the mirror site to assess by reference to the data setting information. With this, load distribution, e.g., among the program content relating site and its mirror site in order to distribute accesses among them.

(4) An information terminal according to the present invention includes: a broadcast wave receiving section for receiving a broadcast wave; a name resolution section for performing name resolution in order to find, from a site name, an address to access; and a browsing section for browsing to the address found by the name resolution means; and a current location acquiring section for acquiring a current location of the information terminal. In order to attain the object, the information terminal according to the present invention is provided with: a storage section for storing look-up data that indicates associations of a site name and a plurality of addresses of sites that are provided for different areas respectively; an information extracting section for extracting, from the broadcast wave received by the broadcast wave receiving means, data setting information with which the look-up data is to be updated so as to update the association of the site name and the address(es) stored in the storage section or to add an association of a site name and an address(es) in the storage section; an address selecting means for randomly selecting an address from among the plurality of addresses in the associations that are stored in the storage section and correspond to an area in which the current location acquired by the current location acquiring means is included. In this arrangement, by the site name, the browsing means browsing to the address randomly selected by address selecting means from among the plurality of addresses of the associations that correspond to the site name and are found by the name resolution means performing the name resolution by searching across the look-up data.

Moreover, a method according to the present invention is for controlling an information terminal including: a broadcast wave receiving section for receiving a broadcast wave; a name resolution section for performing name resolution in order to find, from a site name, an address to access; and a browsing section for browsing to the address found by the name resolution means; and a current location acquiring section for acquiring a current location of the information terminal. In order to attain the object, the method according to the present invention is provided with: extracting, from the broadcast wave received by the broadcast wave receiving means, data setting information with which the look-up data is to be updated so as to update the association of the site name and the address(es) stored in a storage section or to add an association of a site name and an address(es) in the storage section; the name resolution means performing the name resolution by searching, across the look-up data, for the plurality of addresses of the associations that correspond to the site name; and randomly selecting an address from among the plurality of addresses of the associations found by the name resolution means, the browsing means browsing to the selected address by the site name.

In this arrangement, when a user of the information terminal is to browse to a local information providing site, the browsing section browses to the address of the local information providing site that is selected out of the addresses of the local information providing site and mirror sites that are acquired from the look-up data by the name resolution section according to the current location of the information terminal. The local information providing site and its mirror site, one of which has the acquired address, are sites that provide local information of an area in which the current location of the information terminal is included. As a result of the browsing section browsing to the local information providing site or the mirror site that provides the local information regarding the area in which the information terminal is currently located, the content of the local information providing site switched according to the current location of the information terminal is presented (e.g., displayed).

For example, if the information terminal is located in a first area, one of (a) an address of a local information providing site that provides information regarding the first area and (b) an address of a mirror site thereof is selected. (The addresses are described in the look-up data.) Then, the selected address is sent to the browsing section by the name resolution section as the address to access as the local information providing site.

If the information terminal is located in a second area, one of (a) an address of a local information providing site that provides information regarding the second area and (b) an address of a mirror site thereof is selected. (The addresses are described in the look-up data.) Then, the selected address is sent to the browsing section by the name resolution section as the address to access as the local information providing site.

With this arrangement, it is possible to access to a local information providing site suitable for the current location of the information terminal by reference to the look-up data which indicates associations of a common site name of the local information providing sites, areas, and addresses of the local information providing sites and mirror site that provide information on the respective areas. The look-up data is updated with data setting information transmitted via the broadcast wave. Thus, it is possible to browse the contents of the local information providing site suitable for the current location of the information terminal simply by inputting or designating the common site name of the local information providing sites. That is, it is possible to eliminate the need of manually inputting various URIs to browse various sites.

The information terminal may be realized as a hardware, or may be realized by running a program on a computer. Specifically, a program (program for controlling an information terminal) according to the present invention is an information processing program that causes a computer to function as at least the name resolution section, browsing section, and information extracting section. A storage medium according to the present invention stores therein the information processing program.

The computer operates as any of the above-described information terminal by running the information processing program on the computer.

Therefore, the data setting information provided from the program content relating site is broadcasted via the broadcast wave, as in the information terminals. With this, it is possible to switch, according to the data setting information, the contents to be displayed on the program content relating site when the information terminal browse thereto. Thus, the user of the information terminal can browse various contents relating to the various program relating site simply by inputting or designating the URI of the program content relating site. That is, it is possible to eliminate the need of manually inputting various URIs to browse various sites.

With this arrangement, it is possible to access to a local information providing site suitable for the current location of the information terminal by reference to the look-up data which indicates associations of a common site name of the local information providing sites, areas, and addresses of the local information providing sites that provide information on the respective areas. The look-up data is updated with data setting information transmitted via the broadcast wave. Thus, it is possible to browse the contents of the local information providing site suitable for the current location of the information terminal simply by inputting or designating the common site name of the local information providing sites. That is, it is possible to eliminate the need of manually inputting various URIs to browse various sites.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An information terminal comprising:
   a broadcast wave receiving section for receiving a broadcast wave containing data setting information superimposed on a broadcast program;
   a name resolution section for performing name resolution in order to find, from a site name, a corresponding address to access;
   a browsing section for browsing to the address;
   a storage section for storing look-up data that indicates association of the site name and the address that corresponds to the site name; and
   an information extracting section for extracting, from the broadcast wave received by the broadcast wave receiving section, the data setting information with which the look-up data is to be updated so as to update the site name and the address corresponding thereto stored in the storage section or to add a site name and an address corresponding thereto in the storage section,
   wherein the name resolution section performing the name resolution by searching, across the storage section, for the address that corresponds to the site name, and the browsing section browsing to the address found by the name resolution section, and
   wherein the data setting information includes address look-up information that informs association of URI of a program information providing site and an IP address of a particular site.

2. An information terminal comprising:
   a broadcast wave receiving section for receiving a broadcast wave containing data setting information superimposed on a broadcast program;
   a name resolution section for performing name resolution in order to find, from a common site name, a corresponding address to access;
   a browsing section for browsing to the address;
   a current location acquiring section for acquiring a current location of the information terminal;
   a storage section for storing look-up data that indicates an association of a common site name and a plurality of addresses of sites that are provided for different areas respectively; and
   an information extracting section for extracting, from the broadcast wave received by the broadcast wave receiving section, the data setting information with which the look-up data is to be updated so as to update the common site name and at least one of the plurality of addresses corresponding thereto stored in the storage section or to add a common site name and at least one address corresponding thereto in the storage section,
   wherein the name resolution section performing the name resolution by searching, across the look-up data, for the plurality of addresses associated with the common site name, and selecting, from among the plurality of addresses, an address corresponding to an area in which the current location is included, and the browsing section browsing to the address found by the name resolution section, and wherein the data setting information includes address look-up information that informs association of URI of a program information providing site and an IP address of a particular site.

3. An information terminal comprising:
a broadcast wave receiving section for receiving a broadcast wave containing data setting information superimposed on a broadcast program;
a name resolution section for performing name resolution in order to find, from a common site name, a corresponding address to access;
a browsing section for browsing to the address to access;
a storage section for storing look-up data that indicates an association of the common site name and a plurality of addresses, the plurality of addresses including the address to access; and
an information extracting section for extracting, from the broadcast wave received by the broadcast wave receiving section, the data setting information with which the look-up data is to be updated so as to update the common site name and at least one of the plurality of addresses corresponding thereto stored in the storage section or to add a common site name and at least one address corresponding thereto in the storage section; and
wherein the name resolution section randomly selects the address to access from among the plurality of addresses that correspond to the common site name stored in the storage section, and the browsing section browsing to the address to access randomly selected by the name resolution section, and
wherein the data setting information includes address look-up information that informs association of URI of a program information providing site and an IP address of a particular site.

4. An information terminal comprising:
a broadcast wave receiving section for receiving a broadcast wave containing data setting information superimposed on a broadcast program;
a name resolution section for performing name resolution in order to find, from a site name, a corresponding address to access;
a browsing section for browsing to the address;
a current location acquiring section for acquiring a current location of the information terminal;
a storage section for storing look-up data that indicates associations of a site name and a plurality of addresses of sites that are provided for different areas respectively; and
an information extracting section for extracting, from the broadcast wave received by the broadcast wave receiving section, the data setting information with which the look-up data is to be updated so as to update the association of the site name and at least one of the plurality of addresses stored in the storage section or to add an association of a site name and at least one address in the storage section;
the name resolution section randomly selects the address to access from among the plurality of addresses that correspond to the site name in the associations that are stored in the storage section and correspond to an area in which the current location is included, and the browsing section browsing to the address to access randomly selected by the name resolution section, wherein the data setting information includes address look-up information that informs association of URI of a program information providing site and an IP address of a particular site.

5. A method for controlling an information terminal, the method comprising the steps of:
a broadcast wave receiving section receiving a broadcast wave containing data setting information superimposed on a broadcast program;
an information extracting section extracting, from the broadcast wave received by the broadcast wave receiving section, the data setting information with which look-up data is to be updated so as to update a site name and an address corresponding thereto stored in a storage section or to add a site name and an address corresponding thereto in the storage section;
a name resolution section performing name resolution by searching, across the look-up data, for the address that corresponds to the site name; and
a browsing section browsing to the address by the site stored in the look-up data,
wherein the data setting information includes address look-up information that informs association of URI of a program information providing site and an IP address of a particular site.

6. A method for controlling an information terminal, the method comprising the steps of including:
a broadcast wave receiving section receiving a broadcast wave containing data setting information superimposed on a broadcast program;
a current location acquiring section acquiring a current location of the information terminal;
an information extracting section extracting, from the broadcast wave received by the broadcast wave receiving section, the data setting information with which the look-up data is to be updated so as to update a common site name and at least one of a plurality of addresses corresponding thereto stored in a storage section or to add a common site name and at least one address corresponding thereto in the storage section;
a name resolution section performing name resolution by searching, across the look-up data, for the plurality of addresses that correspond to the common site name;
the name resolution section selecting, from among the plurality of addresses, an address that corresponds to an area in which the current location is included; and
a browsing section browsing to the selected address by the site stored in the look-up data,
wherein the data setting information includes address look-up information that informs association of URI of a program information providing site and an IP address of a particular site.

7. A method for controlling an information terminal, the method comprising the steps of:
a broadcast wave receiving section receiving a broadcast wave containing data setting information superimposed on a broadcast program;
an information extracting section extracting, from the broadcast wave received by the broadcast wave receiving section, the data setting information with which the look-up data is to be updated so as to update a common site name and a plurality of addresses corresponding thereto stored in a storage section or to add a common site name and at least one address corresponding thereto in the storage section;

a name resolution section performing name resolution by searching, across the look-up data, for the plurality of addresses that correspond to the common site name;

the name resolution section randomly selecting an address from among the plurality of addresses; and a browsing section browsing to the selected address by the site stored in the look-up address, wherein the data setting information includes address look-up information that informs association of URI of a program information providing site and an IP address of a particular site.

8. A method for controlling an information terminal including, the method comprising the steps of:

a broadcast wave receiving section receiving a broadcast wave containing data setting information superimposed on a broadcast program;

a current location acquiring section for acquiring a current location of the information terminal;

an information extracting section extracting, from the broadcast wave received by the broadcast wave receiving section, the data setting information with which the look-up data is to be updated so as to update an association of a site name and a plurality of addresses stored in a storage section or to add an association of a site name and at least one address in the storage section;

a name resolution section performing name resolution by searching, across the look-up data, for the plurality of addresses of the associations that correspond to the site name;

the name resolution section randomly selecting an address from among the plurality of addresses of the associations; and a browsing section browsing to the selected address by the site name, wherein the data setting information includes address look-up information that informs association of URI of a program information providing site and an IP address of a particular site.

9. A computer storage medium in which a computer program is stored, the computer program controlling an information terminal comprising:

a broadcast wave receiving section for receiving a broadcast wave containing data setting information superimposed on a broadcast program;

a name resolution section for performing name resolution in order to find, from a site name, a corresponding address to access;

a browsing section for browsing to the address;

a storage section for storing look-up data that indicates association of the site name and the address that corresponds to the site name; and an information extracting section for extracting, from the broadcast wave received by the broadcast wave receiving section, the data setting information with which the look-up data is to be updated so as to update the site name and the address corresponding thereto stored in the storage section or to add a site name and an address corresponding thereto in the storage section, wherein the name resolution section performing the name resolution by searching, across the storage section, for the address that corresponds to the site name, and the browsing section browsing to the address found by the name resolution section, and wherein the data setting information includes address look-up information that informs association of URI of a program information providing site and an IP address of a particular site.

10. A computer storage medium in which a computer program is stored, the computer program controlling an information terminal including:

a broadcast wave receiving section for receiving a broadcast wave containing data setting information superimposed on a broadcast program;

a name resolution section for performing name resolution in order to find, from a common site name, a corresponding address to access;

a browsing section for browsing to the address;

a current location acquiring section for acquiring a current location of the information terminal;

a storage section for storing look-up data that indicates an association of a common site name and a plurality of addresses of sites that are provided for different areas respectively; and an information extracting section for extracting, from the broadcast wave received by the broadcast wave receiving section, the data setting information with which the look-up data is to be updated so as to update the common site name and at least one of the plurality of addresses corresponding thereto stored in the storage section or to add a common site name and at least one address corresponding thereto in the storage section, wherein the name resolution section performing the name resolution by searching, across the look-up data, for the plurality of addresses associated with the common site name, and selecting, from among the plurality of addresses, an address corresponding to an area in which the current location is included, and the browsing section browsing to the address found by the name resolution section and wherein the data setting information includes address look-up information that informs association of URI of a program information providing site and an IP address of a particular site.

11. A computer storage medium in which a computer program is stored, the computer program controlling an information terminal including:

a broadcast wave receiving section for receiving a broadcast wave containing data setting information superimposed on a broadcast program;

a name resolution section for performing name resolution in order to find, from a common site name, a corresponding address to access;

a browsing section for browsing to the address to access;

a storage section for storing look-up data that indicates an association of the common site name and a plurality of addresses, the plurality of addresses including the address to access; and an information extracting section for extracting, from the broadcast wave received by the broadcast wave receiving section, the data setting information with which the look-up data is to be updated so as to update the common site name and at least one of the plurality of addresses corresponding thereto stored in the storage section or to add a common site name and at least one address corresponding thereto in the storage section;

wherein the name resolution section randomly selects the address to access from among the plurality of addresses that correspond to the common site name stored in the storage section, and the browsing section browsing to the address randomly selected by the name resolution section, and wherein the data setting information includes address look-up information that informs association of URI of a program information providing site and an IP address of a particular site.

12. A computer storage medium in which a computer program is stored, the computer program controlling an information terminal including:
- a broadcast wave receiving section for receiving a broadcast wave containing data setting information superimposed on a broadcast program;
- a name resolution section for performing name resolution in order to find, from a site name, a corresponding address to access;
- a browsing section for browsing to the address;
- a current location acquiring section for acquiring a current location of the information terminal;
- a storage section for storing look-up data that indicates associations of a site name and a plurality of addresses of sites that are provided for different areas respectively; and
- an information extracting section for extracting, from the broadcast wave received by the broadcast wave receiving section, the data setting information with which the look-up data is to be updated so as to update the association of the site name and at least one of the plurality of addresses stored in the storage section or to add an association of a site name and at least one address in the storage section;

wherein the name resolution section randomly selects the address to access from among the plurality of addresses that correspond to the site name in the associations that are stored in the storage section and correspond to an area in which the current location is included, and the browsing section browsing to the address to access randomly selected by the name resolution section, and wherein the data setting information includes address look-up information that informs association of URI of a program information providing site and an IP address of a particular site.

* * * * *